US012106890B2

(12) United States Patent
Fox

(10) Patent No.: US 12,106,890 B2
(45) Date of Patent: Oct. 1, 2024

(54) INDUCTIVE COUPLER FOR DOWNHOLE TRANSMISSION LINE

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 567 days.

(21) Appl. No.: 17/510,732

(22) Filed: Oct. 26, 2021

(65) Prior Publication Data

US 2022/0157517 A1 May 19, 2022
US 2022/0270817 A2 Aug. 25, 2022

(51) Int. Cl.

*E21B 17/02* (2006.01)
*H01F 27/02* (2006.01)
*H01F 27/36* (2006.01)
*H01F 38/14* (2006.01)
*H01F 27/04* (2006.01)

(52) U.S. Cl.

CPC ......... *H01F 38/14* (2013.01); *E21B 17/0283* (2020.05); *H01F 27/022* (2013.01); *H01F 27/366* (2020.08); *H01F 27/04* (2013.01); *H01F 2038/143* (2013.01)

(58) Field of Classification Search

CPC .................................................... E21B 17/0283
See application file for complete search history.

(56) References Cited

U.S. PATENT DOCUMENTS 7,041,908 B2 * 5/2006 Hall .................... H01R 13/6633 174/75 C
2005/0046590 A1 * 3/2005 Hall .................... E21B 17/0283 340/854.8

* cited by examiner

*Primary Examiner* — Robert E Fuller

(57) ABSTRACT

An annular block of polymer comprising an inductive coupler assembly configured to fit within a groove in the shoulder of a drill pipe joint. The assembly comprises a ferrite channel arranged around the interior of the block. At least one turn of a conductive wire is deposed within the channel. The block comprises a bumper comprising jutting from the block. The block comprises internal void openings adjacent its vertical side surfaces. A void opening is disposed proximate the bumper. The block further comprises an internal gasket partially extending from the bottom surface of the block. The external portion of the gasket being formed to fit within a gasket seat in the bottom of the groove. The wire passes through the gasket as it exits the block. When the block is installed into the groove, the gasket seals the wire and the block's components from the downhole environment.

20 Claims, 15 Drawing Sheets

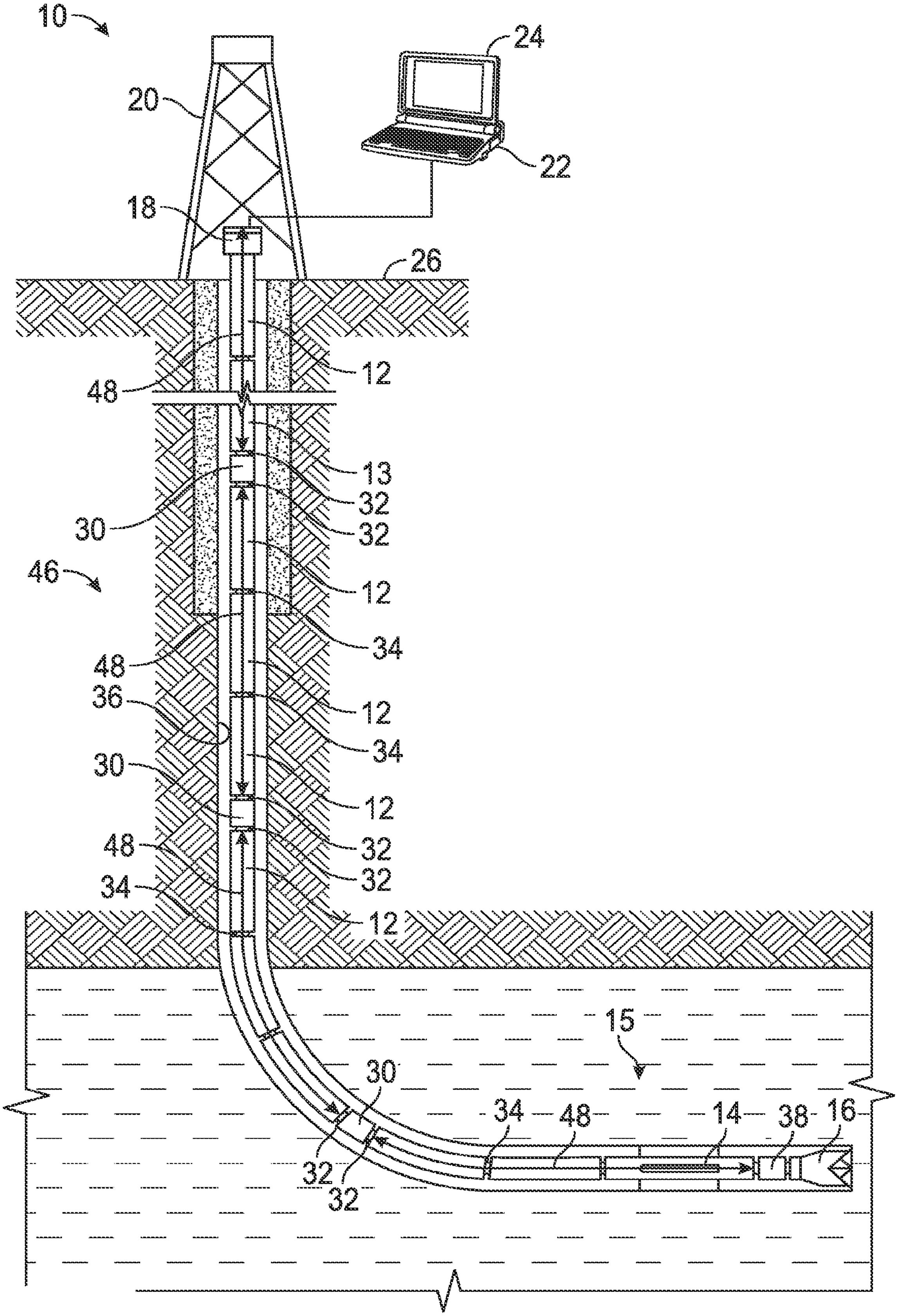
(Prior Art) FIG. 2

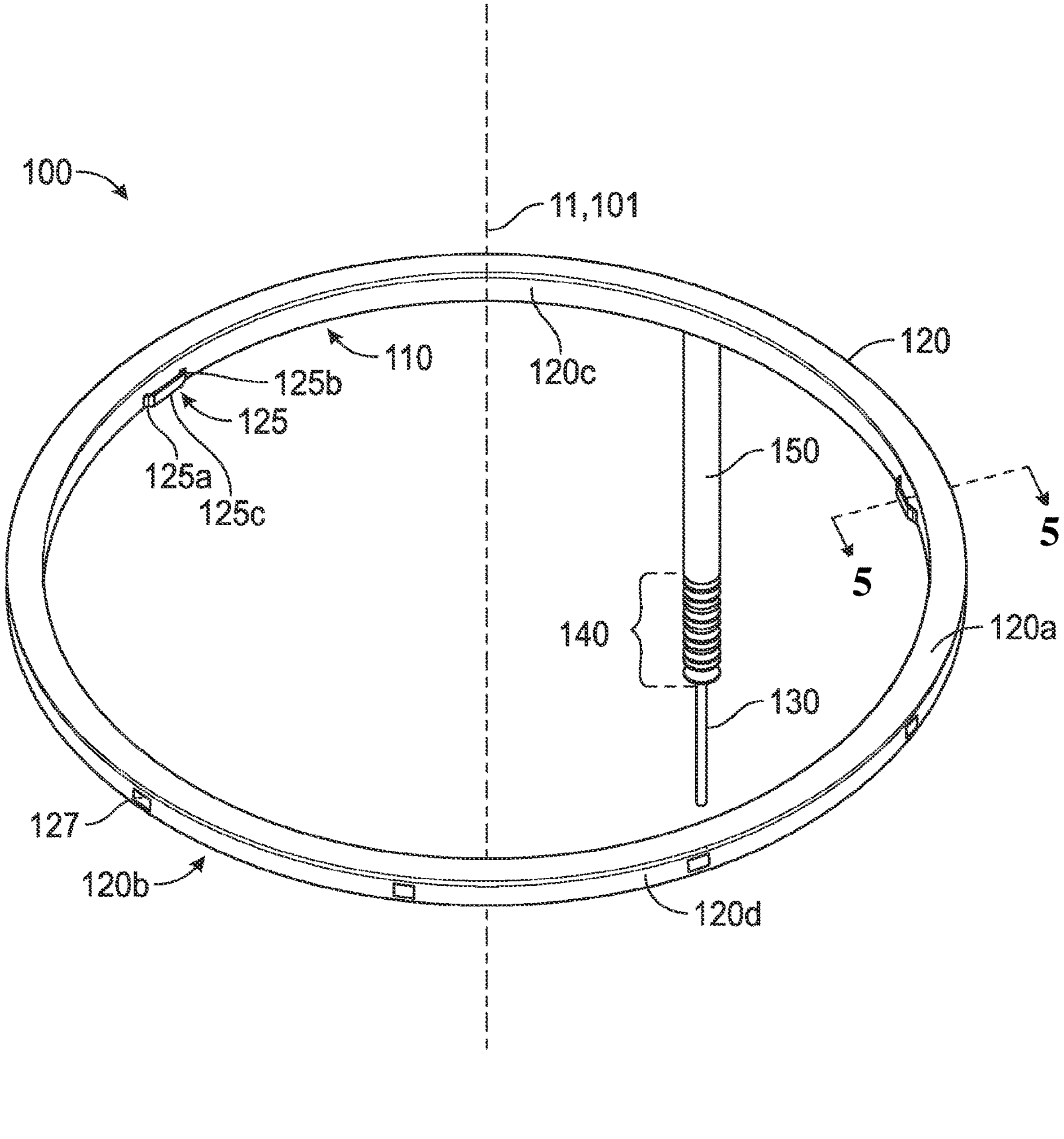
(Prior Art) FIG. 3

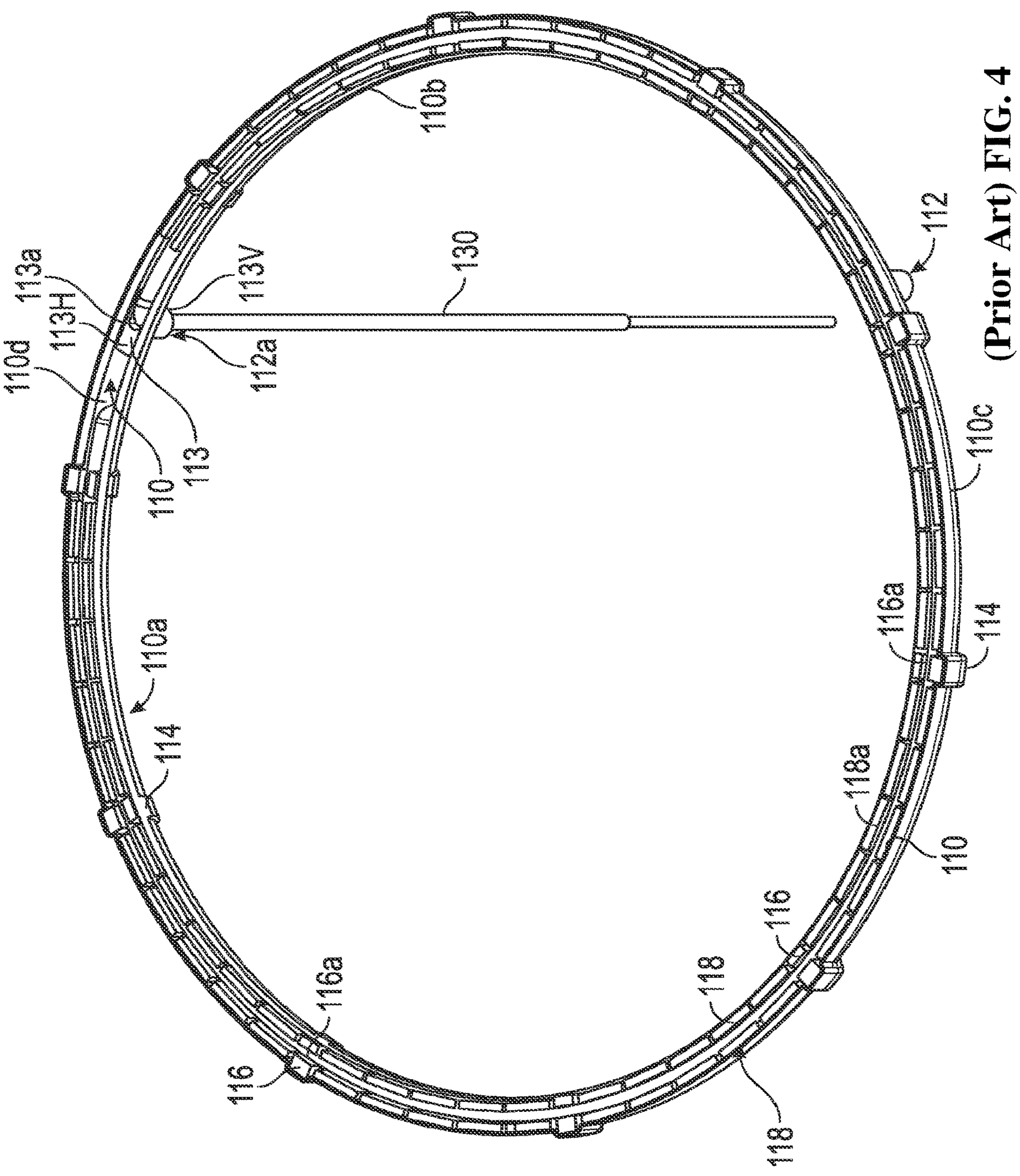
(Prior Art) FIG. 4

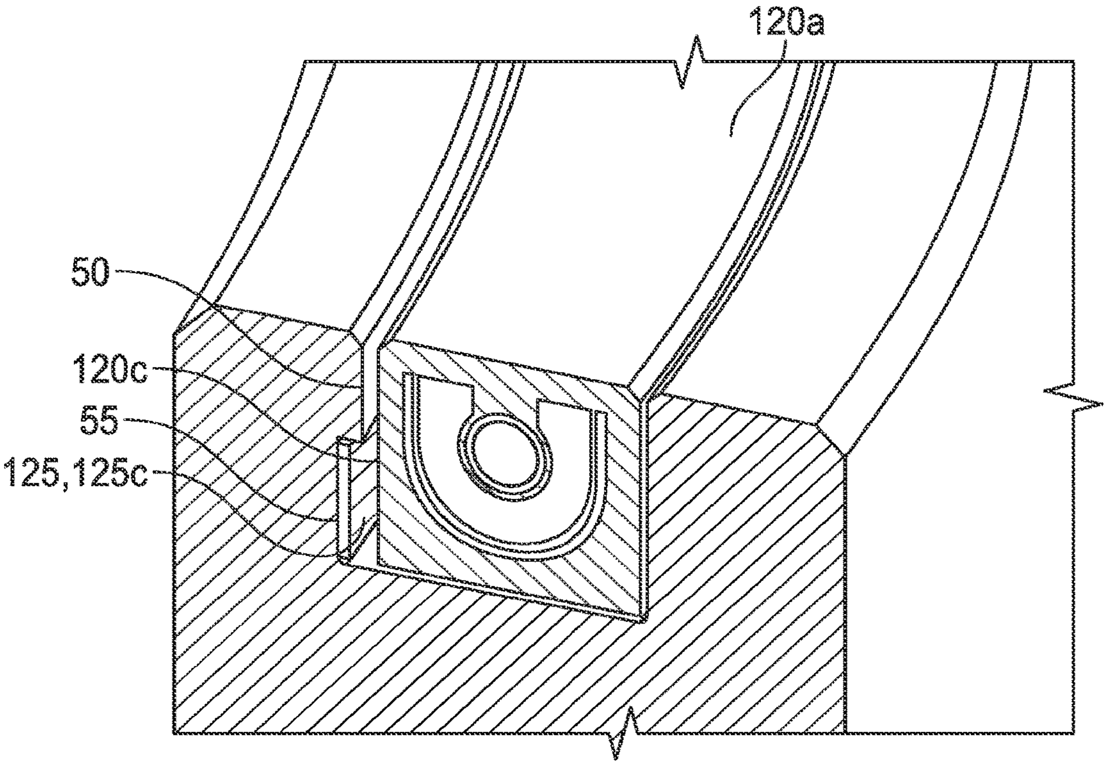
(Prior Art) FIG. 5
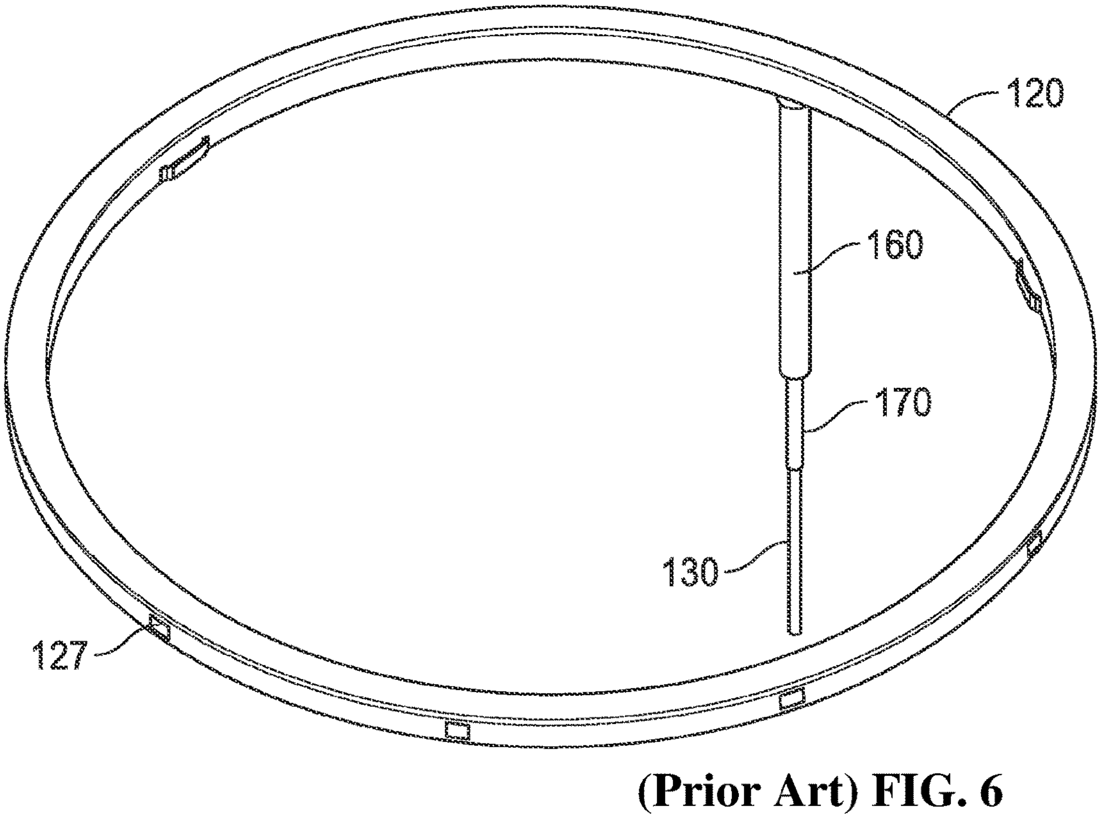
(Prior Art) FIG. 6

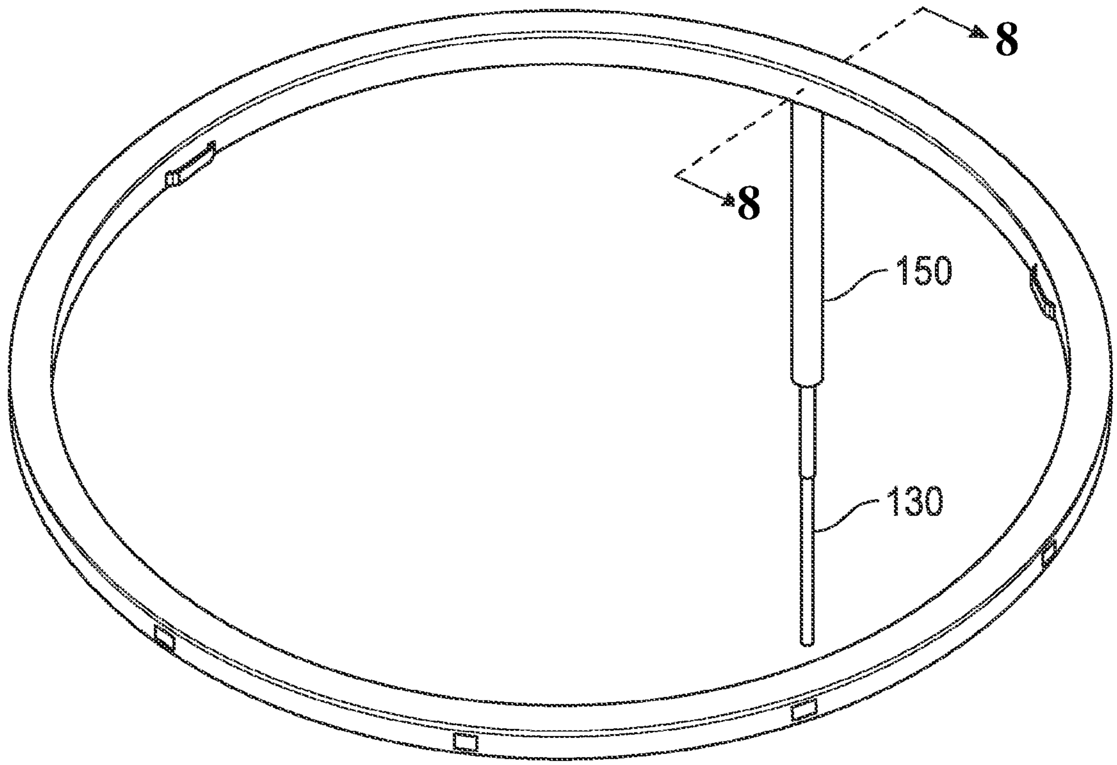
(Prior Art) FIG. 7

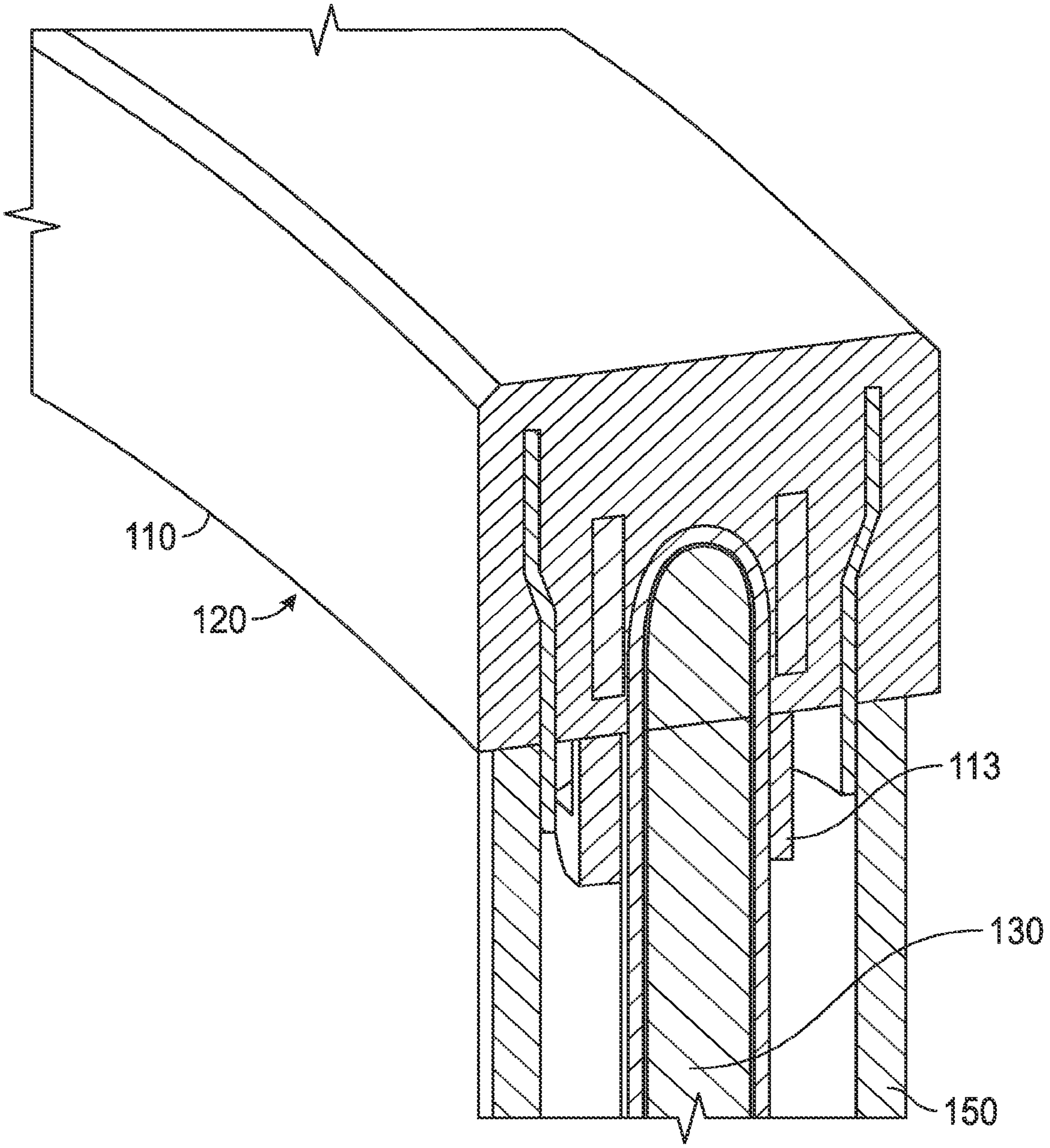
(Prior Art) FIG. 8

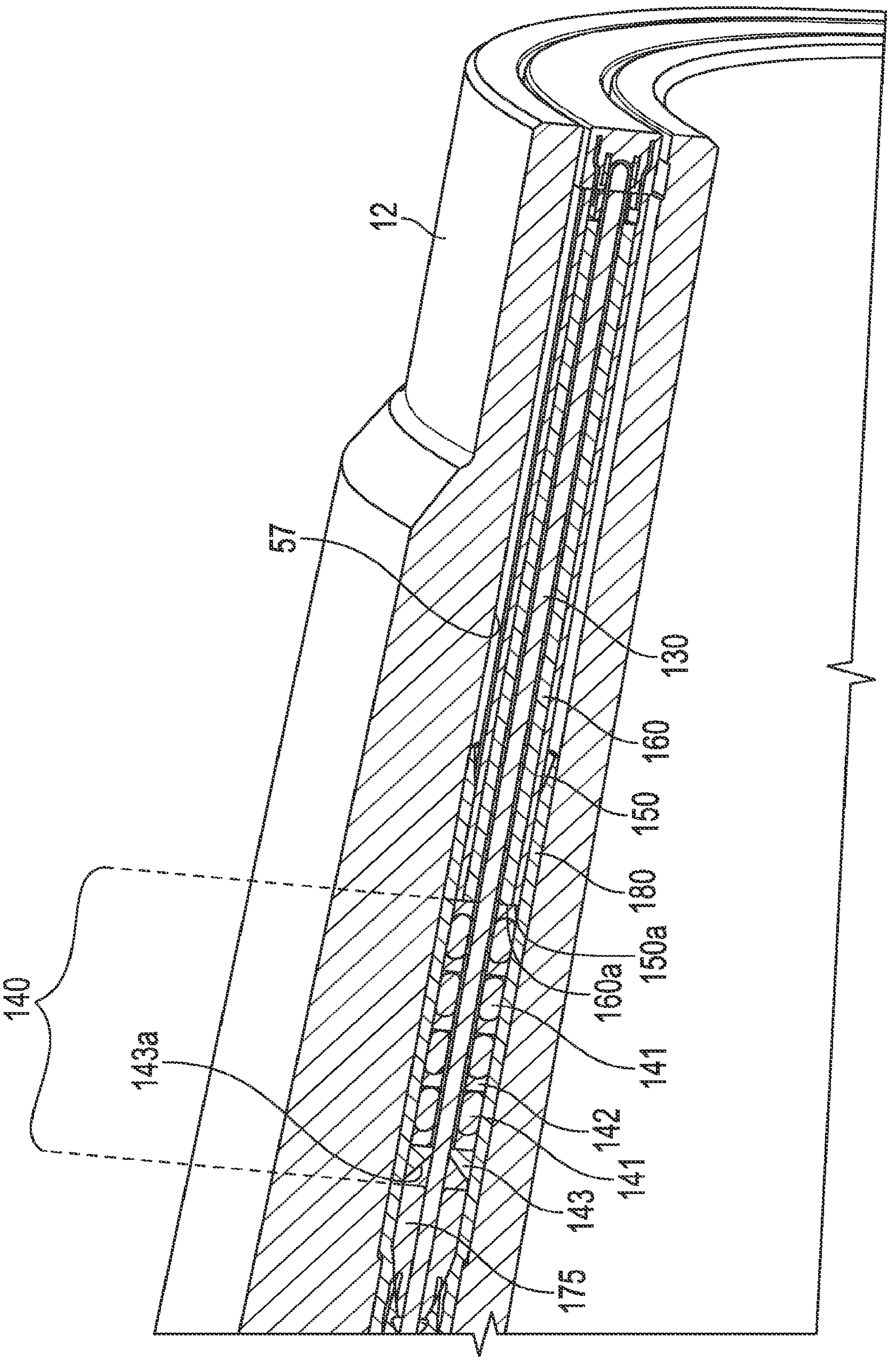
(Prior Art) FIG. 9

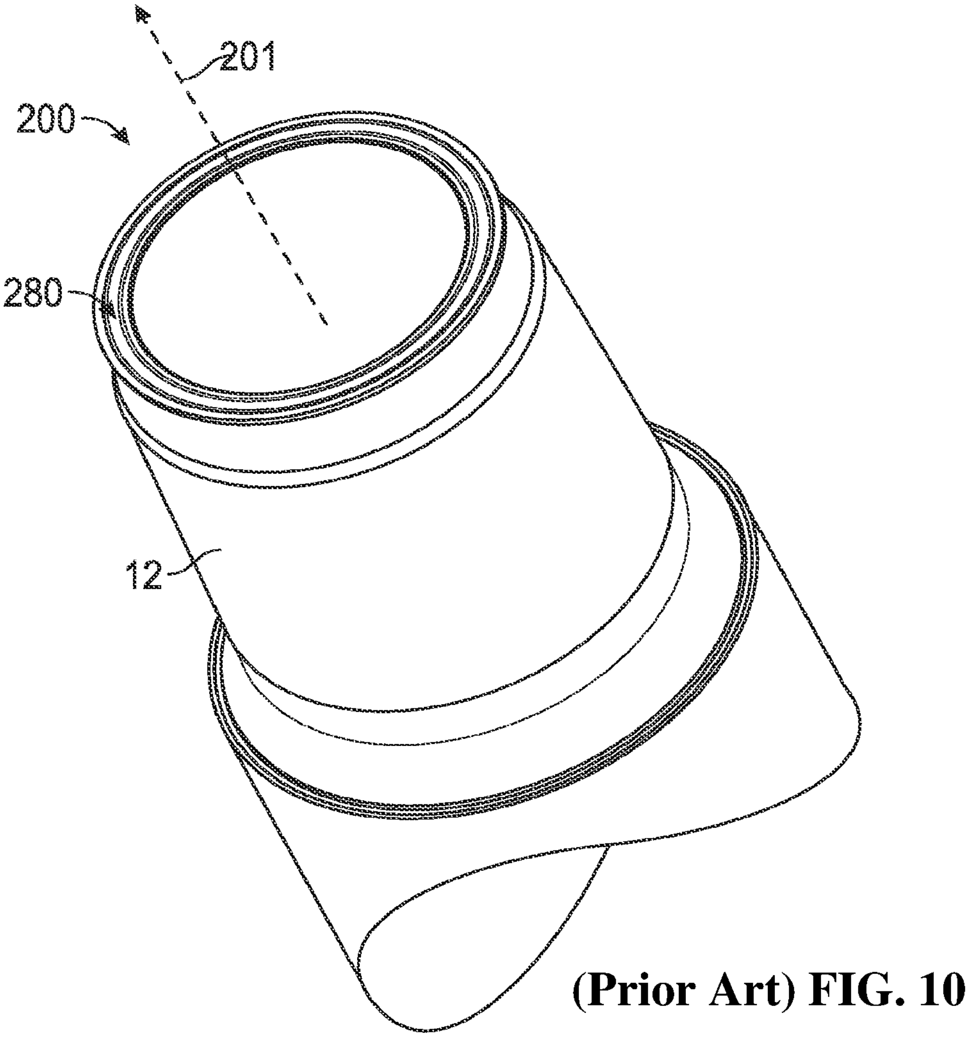
(Prior Art) FIG. 10

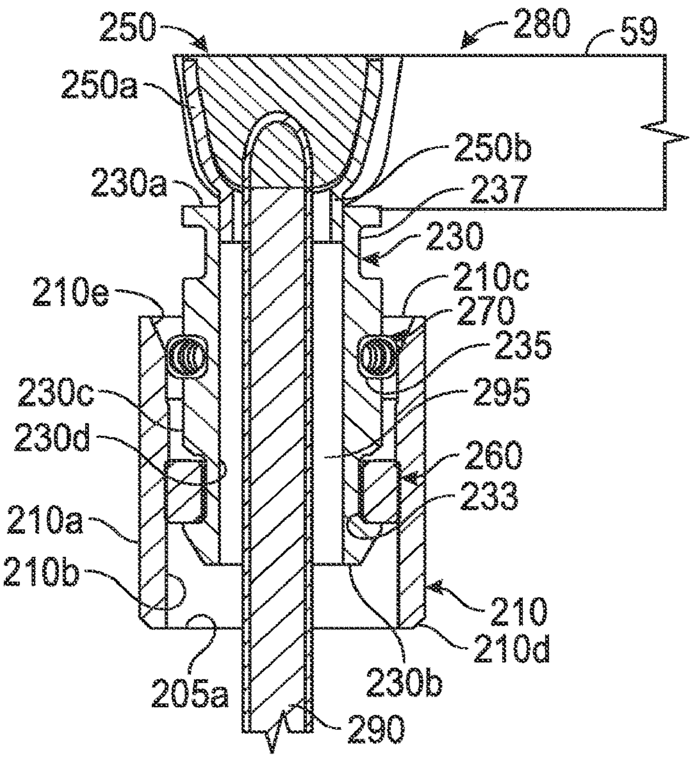
(Prior Art) FIG.11
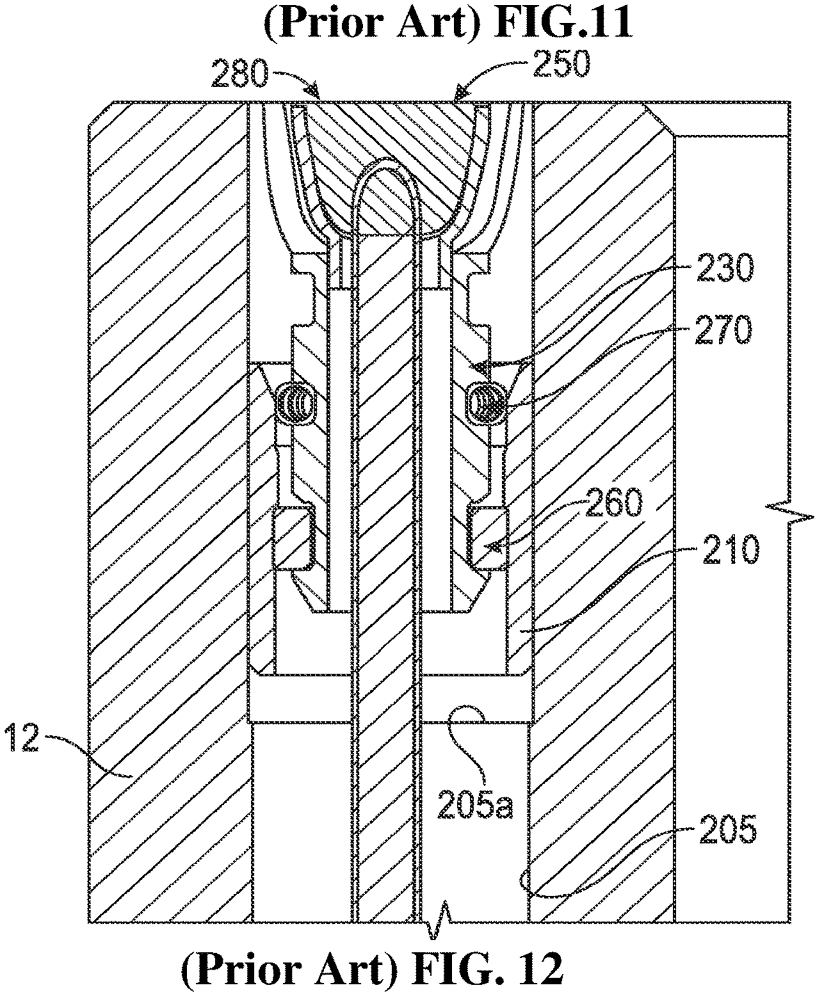
(Prior Art) FIG. 12

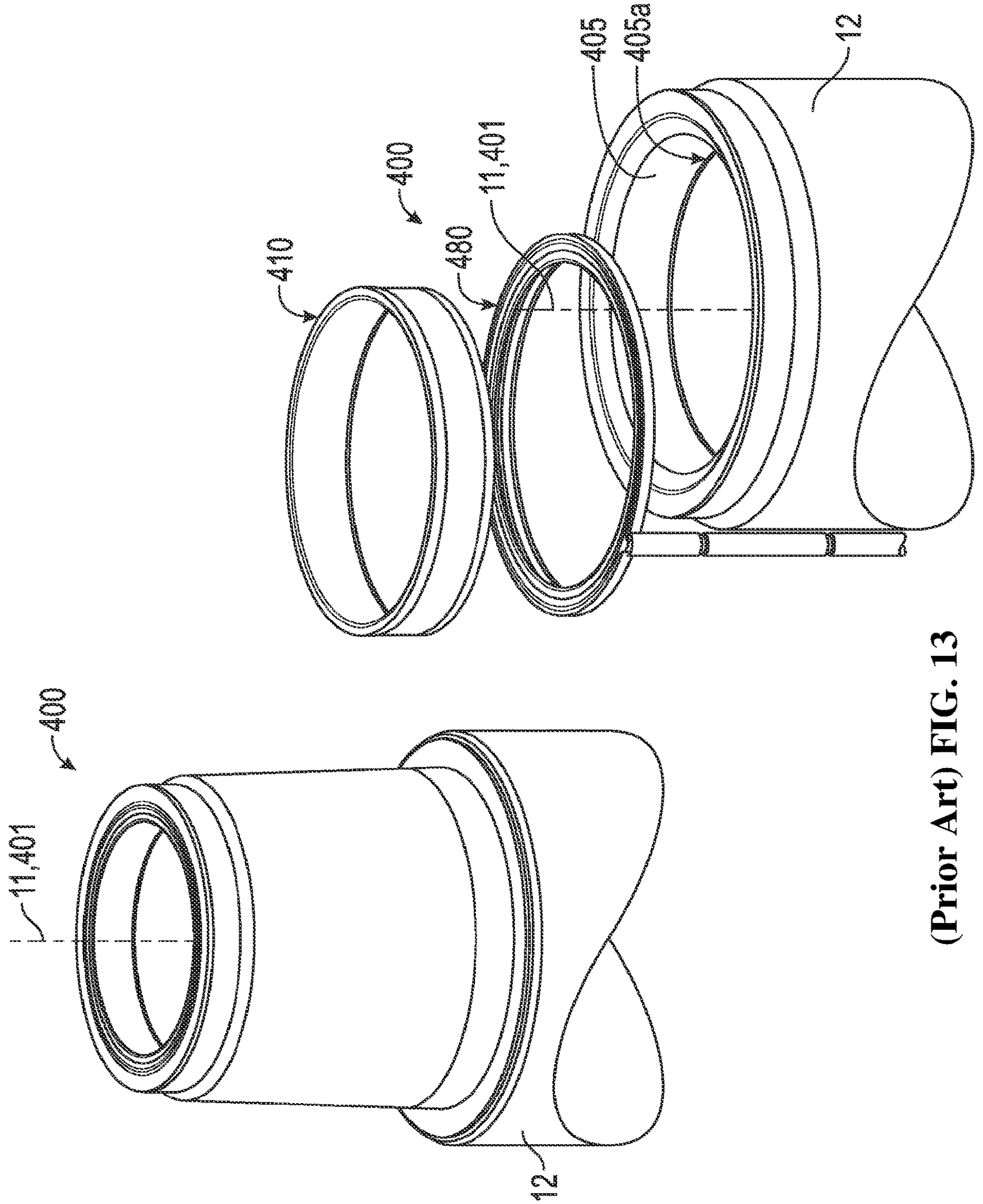
(Prior Art) FIG. 13

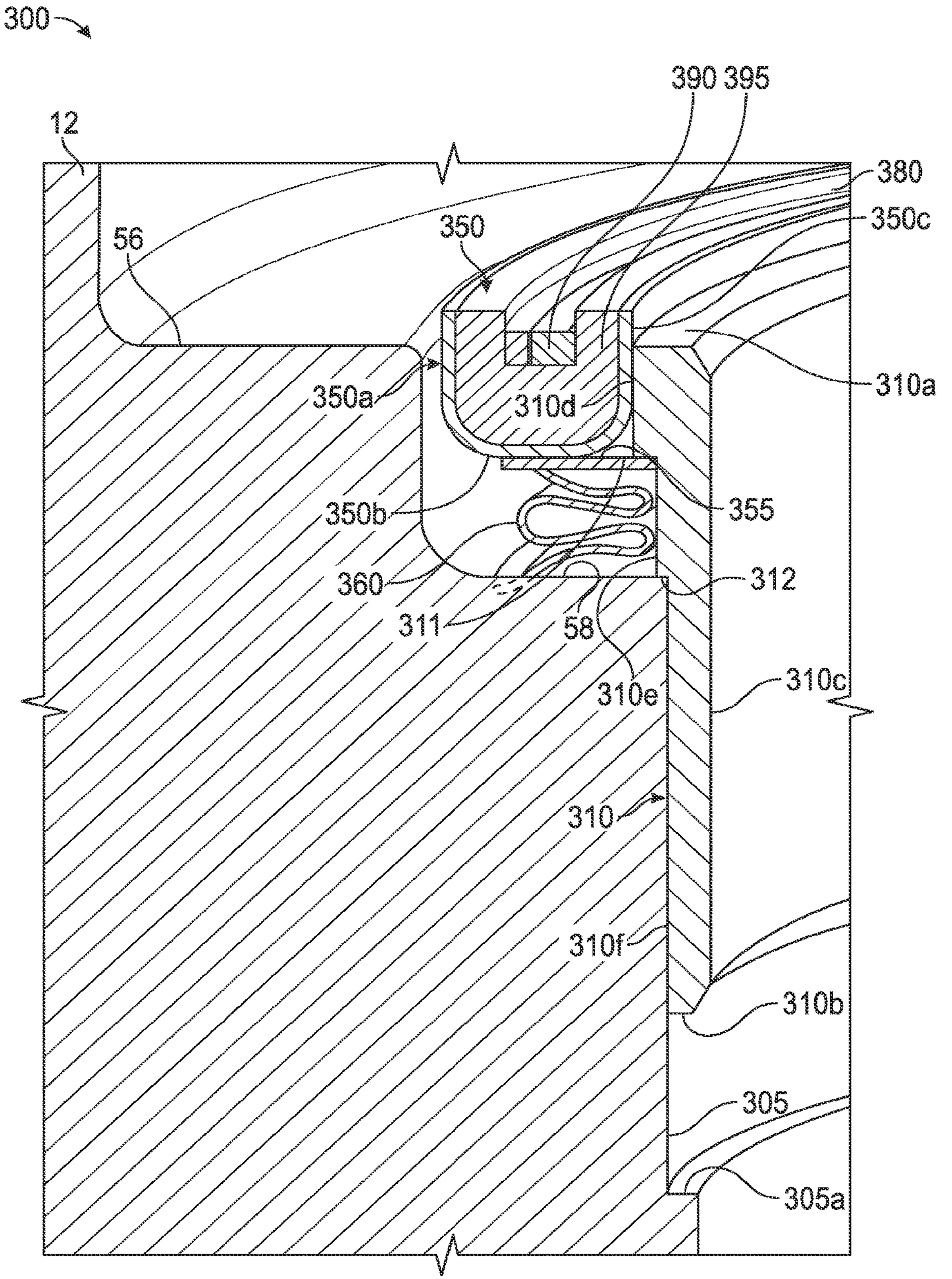
(Prior Art) FIG. 14

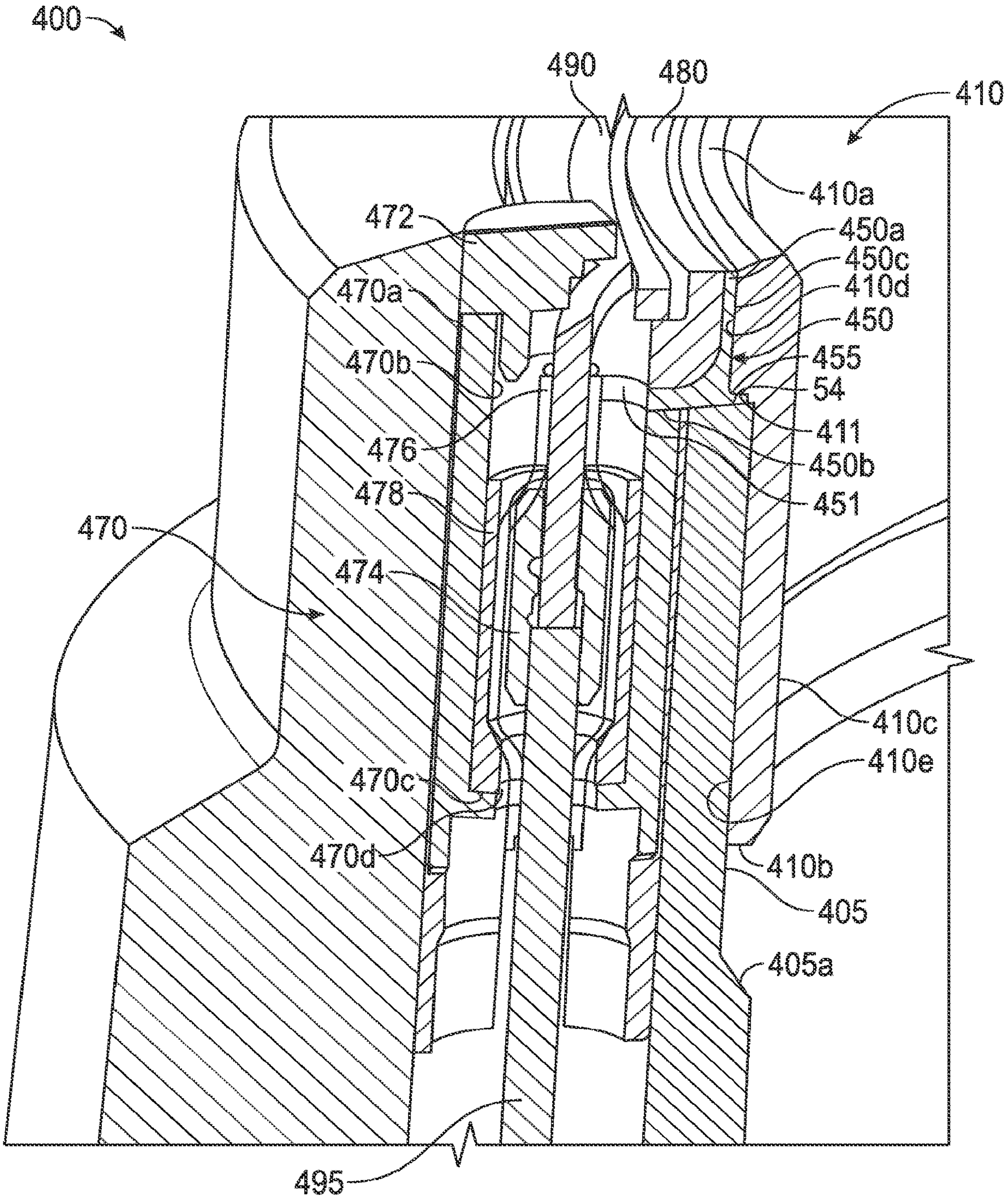
(Prior Art) FIG. 15

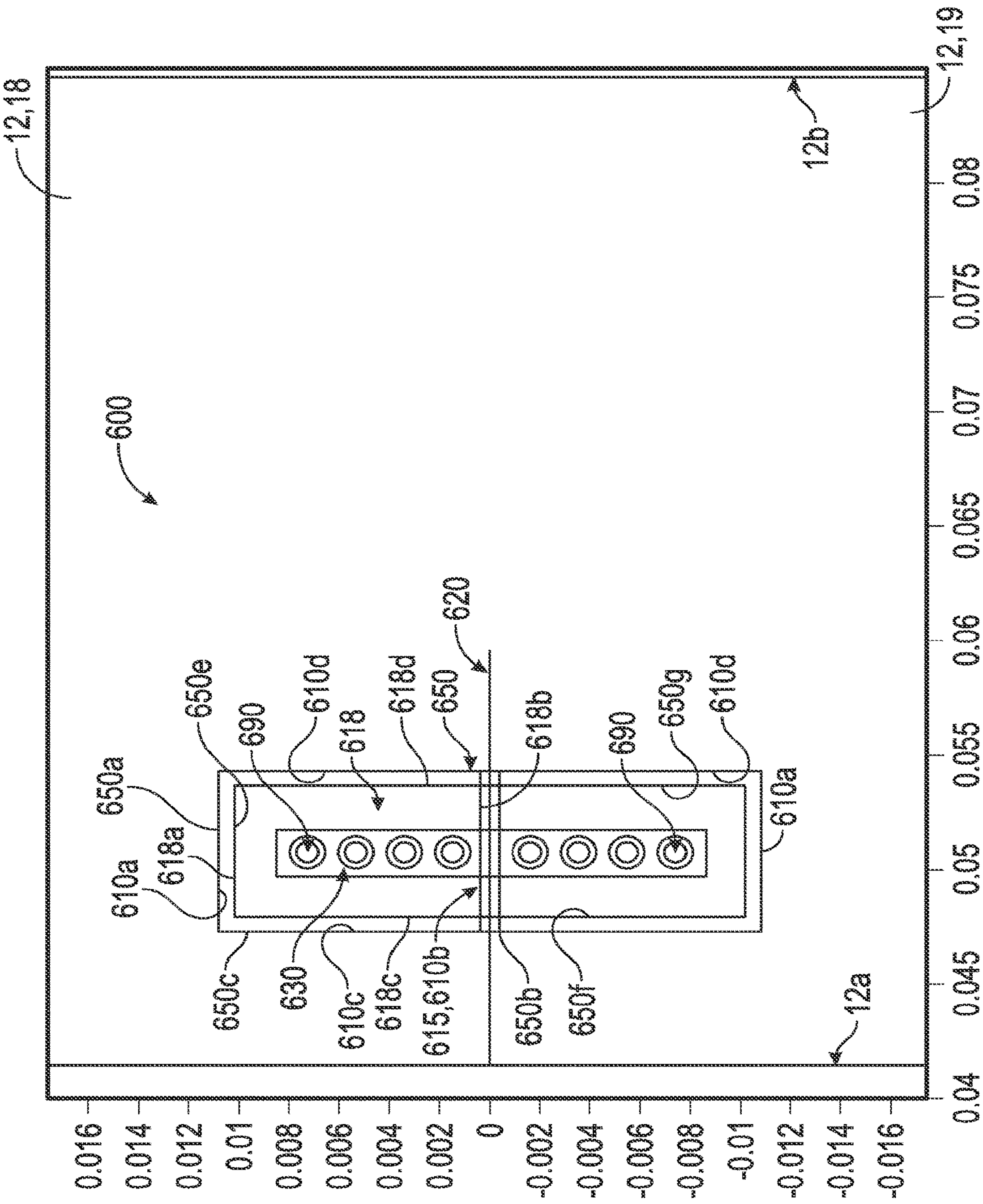
(Prior Art) FIG. 16

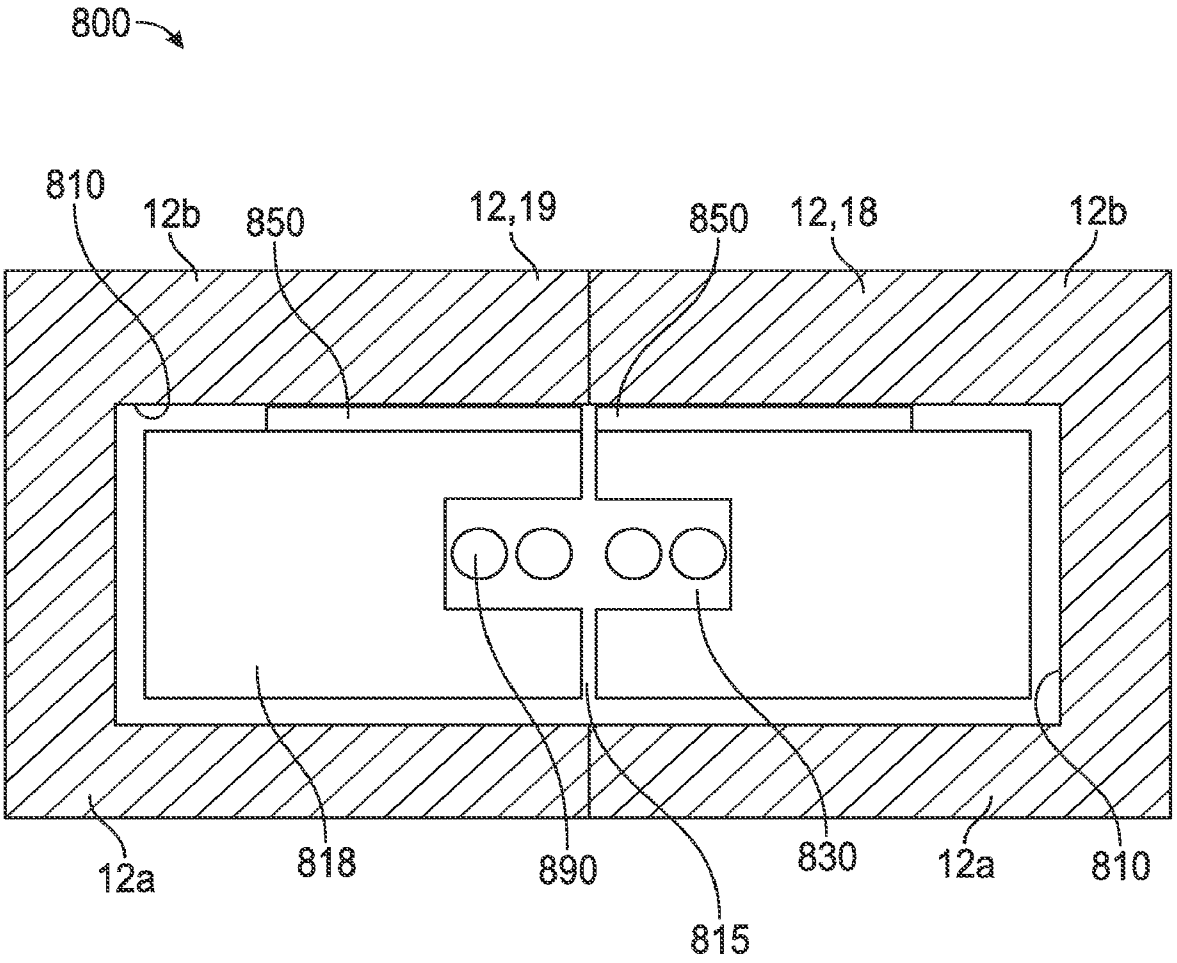
(Prior Art) FIG. 17

INDUCTIVE COUPLER FOR DOWNHOLE TRANSMISSION LINE

BACKGROUND

This disclosure is an alteration and improvement on U.S. Pat. No. 10,612,318, to Darren Wall et al., entitled Inductive Coupler Assembly for Downhole Transmission Line, issued April 7, 2020. The background, prior art figures, and related descriptions herein were taken from said patent.

In downhole drilling operations, downhole measuring tools are used to gather information about geological formations, status of downhole tools, and other downhole conditions. Such data is useful to drilling operators, geologists, engineers, and other personnel located at the surface. This data may be used to adjust drilling parameters, such as drilling direction, penetration speed, and the like, to effectively tap into an oil or gas bearing reservoir. Data may be gathered at various points along the drill string, such as from a bottom-hole assembly or from sensors distributed along the drill string. Once gathered, apparatus and methods are needed to rapidly and reliably transmit the data to the surface. Traditionally, mud pulse telemetry has been used to transmit data to the surface. However, mud pulse telemetry is characterized by a very slow data transmission rate (typically in a range of 1-6 bits/second) and is therefore inadequate for transmitting large quantities of data in real time. Other telemetry systems, such as wired pipe telemetry system and wireless telemetry system, have been or are being developed to achieve a much higher transmission rate than possible with the mud pulse telemetry system.

In wired pipe telemetry systems, inductive couplers or transducers are provided at the ends of wired pipes. The inductive transducers at the opposing ends of each wired pipe are electrically connected by an electrical conductor running along the length of the wired pipe. Data transmission involves transmitting an electrical signal through an electrical conductor in a first wired pipe, converting the electrical signal to a magnetic field upon leaving the first wired pipe using an inductive transducer at an end of the first wired pipe, and converting the magnetic field back into an electrical signal using an inductive transducer at an end of the second wired pipe. Several wired pipes are typically needed for data transmission between the downhole location and the surface.

While downhole, a wired pipe string is subjected to high loads and harsh conditions which can adversely affect the life and function of inductive couplers. In addition, stray magnetic fields may affect inductive transducers by introducing additional inductances to the coupler, which can alter the performance of the coupler. Stray fields can also extend into unsuitable materials and result in increased losses. Stray magnetic fields can produce an increase in attenuation and a decrease in effective bandwidths. Variations in attenuation and bandwidth can cause problems in producing a reliable telemetry rate.

SUMMARY

This disclosure presents an inductive data transmission system for downhole applications comprising an annular block of polymer comprising an inductive coupler assembly formed within the annular block. The inductive coupler assembly may be formed in the annular block by a process of compression molding, injection molding, or by other known methods of encasing components in polymers. The annular block is configured to fit within a circular groove, or annular groove, in the shoulder of a drill pipe joint. The top surface of the block may be planar. The side walls of the circular groove may be parallel or taper downward, and the groove may comprise a curved bottom surface. The annular block may have a curved bottom surface matching the curved bottom of the groove.

When the drill pipe has a primary and secondary shoulder in its joint, the circular groove may be in either shoulder. The respective shoulders are circumferential and located either before or after the threads of the joint. When two drill pipes are made up, i.e., screwed together, the pipe's pin end is screwed into the opposing pipe's box end. The pipes are torqued together sufficiently that the shoulders produce a fluid tight seal preventing the passage of downhole fluids from escaping or entering the bore of the drill pipe. The shoulder seals also prevent pressure loss both between the formation borehole and the pipe bore.

The inductive coupler assembly within the block comprises a ferrite circular channel arranged around the interior of the block. The ferrite covers the sides and bottom of the channel. The channel's top side may be fully open, free of the ferrite, or partially closed by the ferrite. The ferrite channel may intersect the top surface of the block, or it may be fully enclosed within the block. The ferrite channel may comprise a single, gapless ferrite ring or a series of ferrite segments forming the ring. The ends of the ferrite segments may be configured to tightly mate with each other. The ferrite segments may be arranged end for end forming a gap free ring. The ferrite channel may comprise a polished surface along its open or partially open side.

At least one turn of a conductive wire may be deposed within the ferrite channel. The conductive wire turns form a coil that when energized may produce an electromagnetic field that may be directed by the ferrite channel toward an opposed inductive coupler of a mating drill pipe joint. A gapless ring may enhance the electromatic field. An opposing inductive coupler may not be configured similarly with the block of this disclosure. In other words, different designs, versions, and styles of inductive couplers may be electromagnetically coupled with the block of this disclosure.

The annular block may comprise one or more bumpers jutting from the block. The bumper may comprise a side wall that may extend diagonally downward to the side surface of the block. The side wall of the circular groove may comprise a recess that may be open to the bumper such that when the block is installed into the groove the bumper intersects with the recess thereby at least partially removably securing the block in the groove.

The block comprises one or more internal void openings adjacent its side surfaces. A void opening is disposed proximate the bumper. The void openings may promote compliancy in the block. The void opening adjacent the bumper may allow the bumper to compress as the block is press fitted into the groove. Once the bumper enters the recess in the groove's side wall, the bumper is allowed to spring back in the recess thereby at least partially securing the block in the groove. The internal void openings may form a continuous ring around the interior of the block. Or the void openings may be intermittent such that a plurality of void opening may be positioned around the interior circumference of the block. A void opening adjacent the curved bottom surface of the block may permit the block to move vertically in the event debris remains on the top surface of the block when the joint is made up. Also, compliancy in the block provided by the void openings may protect the block in the event the shoulder is damaged in the makeup process or compressed by an over-torqued drill pipe joint.

The block further may comprise an internal annular gasket that may comprise a collar portion partially extending from the bottom surface of the block. The external portion of the gasket may be formed to fit within a mating gasket seat in the bottom of the groove. The wire may pass through an opening in the center of the gasket. When the block is installed into the groove, and the gasket pressed into the gasket seat, the gasket may seal the wire and the assembly from the downhole environment. The gasket may also aid in fixing the position of the block in the groove. The external portion of the gasket may comprise ribs to aid in the sealing of the block. The annular gasket may reduce or eliminate the requirement for a seal set (see Prior Art FIG. 9, reference 140 herein) located further along the conductive wire.

The block may further comprise a shield enclosing the sides and bottom of the ferrite channel. The shield may be composed of a magnetically conductive electrically insulating material. The shield may aid in focusing the magnetic field and preventing stray electromagnetic interference with the block.

BRIEF DESCRIPTION OF THE DRAWINGS

FIG. 2 is a prior art schematic view of a drilling system including an embodiment of a system in accordance with the principles described herein FIG. 3 is a prior art schematic view of an embodiment of an inductive coupler assembly for a downhole transmission line in accordance with the principles described herein;

FIG. 4 is a prior art schematic view of a portion of the inductive coupler of prior art FIG. 3;

FIG. 5 is a prior art enlarged cross-sectional schematic view at plane 5-5 in prior art FIG. 3;

FIG. 6 is a prior art schematic view of a portion of the inductive coupler of prior art FIG. 3;

FIG. 7 is a prior art schematic view of a portion of the inductive coupler of prior art FIG. 3;

FIG. 8 is a prior art enlarged cross-sectional schematic view at plane 8-8 in prior art FIG. 7;

FIG. 9 is a prior art enlarged cross-sectional schematic view of a portion of a system in accordance with the principles disclosed herein;

FIG. 10 is a prior art schematic view of another embodiment of an inductive coupler assembly for a downhole transmission line in accordance with the principles described herein;

FIG. 11 is a prior art enlarged cross-sectional schematic view of a portion of the inductive coupler of prior art FIG. 10;

FIG. 12 is a prior art enlarged cross-sectional schematic view of a portion of the inductive coupler of prior art FIG. 10;

FIG. 13 is a prior art schematic view of a further embodiment of an inductive coupler assembly for a downhole transmission line in accordance with the principles described herein;

FIG. 14 is a prior art enlarged cross-sectional schematic view of a portion of the box end inductive coupler of prior art FIG. 13;

FIG. 15 is a prior art enlarged cross-sectional schematic view of a portion of the pin end inductive coupler of prior art FIG. 13;

FIG. 16 is a prior art cross-sectional schematic view of an additional embodiment of an inductive coupler assembly for a downhole transmission line in accordance with the principles described herein;

FIG. 17 is a prior art cross-sectional schematic view of an alternative embodiment of the inductive coupler assembly of prior art FIG. 16.

DETAILED DESCRIPTION

Figure 1:
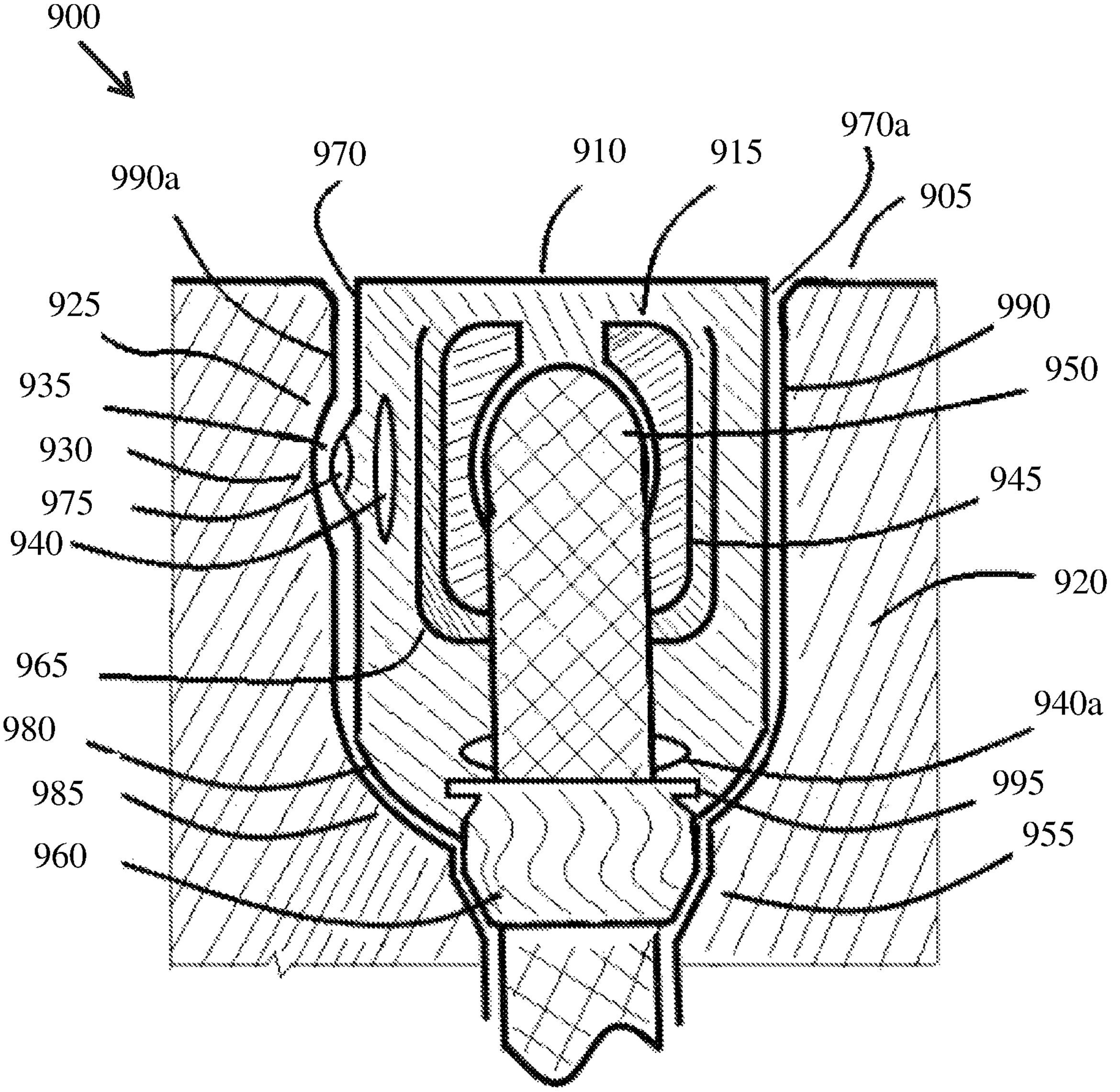
FIG. 1 is a schematic view of an inductive coupler block in accordance with the principles described herein.

The following discussion is directed to FIG. 1 and prior art FIGS. 2-19 as various exemplary embodiments. However, one skilled in the art will understand that the examples disclosed herein have broad application, and that the discussion of any embodiment is meant only to be exemplary of that embodiment, and not intended to suggest that the scope of the disclosures, including the claims, is limited to that embodiment.

Certain terms are used throughout the following description and claim to refer to particular system components. This document does not intend to distinguish between components that differ in name but not function. Moreover, the drawing figures are not necessarily to scale. Certain features of the disclosure may be shown exaggerated in scale or in somewhat schematic form, and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Still further, reference to "up" or "down" may be made for purposes of description with "up," "upper," "upward," or "above" meaning generally toward or closer to the surface of the earth or the beginning of the drill string as the orientation of the drill string elements relative to the earth's surface changes during horizontal drilling, and with "down," "lower," "lower end," "downward," or "below" meaning generally away or further from the surface of the earth or toward the bit end (i.e., the distal end of the drill string) as the orientation of the drill string elements relative to the earth's surface changes during horizontal drilling.

FIG. 1 is a cross-sectional schematic diagram of an inductive coupler assembly (900) taken at a location like 7-7 in prior art FIG. 7, herein. The diagram is enlarged and not to scale for clarity. Gaps adjacent side walls (970 and 970*a*) are also provided for clarity. In actual practice gaps adjacent side walls (970 and 970*a*) may be greatly reduced or non-existent since inductive coupler block (910) may be tightly fit, or press fit, into shoulder (920).

FIG. 1 depicts in schematic diagram an inductive data transmission system assembly (900) for downhole applications comprising an annular block (910) of polymer, or any other like material suitable for use in downhole conditions, comprising inductive coupler assembly (900) formed within annular block (910) having a planar top surface. The annular block (910) is configured to tightly fit, or press fit, within a circular groove (990) formed or machined into the shoulder of a drill pipe joint (920), that may be like that shown at (280) in prior art FIG. 9 and at (58) in prior art FIG. 14, herein. The side walls (990 and 990*a*) of the circular groove (990) may be vertically parallel or they may taper downward narrowing at the groove's (990) curved bottom surface (985). Tapering walls may provide further press fit into the groove (990). The groove's curved bottom surface 985 may reduce the stresses induced into the shoulder (905) as a result of the groove's (990) presence in the shoulder (905). The annular block (910) also may have a curved bottom surface (980) matching the curved bottom of the groove (985).

When the drill pipe has a primary and secondary shoulder in its joint, the circular groove may be in either shoulder. See U.S. Pat. No. 6,821,147, to Hall et al., entitled Internal Coaxial Cable Seal System, issued Nov. 23, 2004, incorporated herein for all it teaches and claims. The respective shoulders are circumferential and located either before or after the threads of the joint. When two drill pipes are made up, i.e., screwed together, the pipe's pin end is screwed into the opposing pipe's box end. The pipes are torqued together sufficiently that the shoulders produce a fluid tight seal preventing the passage of downhole fluids from escaping or entering the bore of the drill pipe. The shoulder seals also prevent pressure loss both between the formation borehole and the pipe bore.

The inductive coupler assembly (900) comprises a ferrite circular channel (945) arranged around the interior of the block (910). The ferrite forms the sides and bottom of the channel (945). The ferrite channel's top side (915) may be fully open, free of the lining, or partially closed by the ferrite. The ferrite channel's top side (915) may intersect the top surface of the block (910), or it may be fully enclosed within the block (910). The ferrite channel (945) may be a discrete ferrite ring or a series of ferrite segments forming the channel (945). The ends of the ferrite segments may be configured to tightly mate with each other. The ferrite segments may be arranged end for end forming a gap-free channel (945). The ferrite channel's top surface (915) may comprise a polished surface along its open or partially open side.

At least one turn of a conductive wire (950) may be disposed within the ferrite channel (945). The conductive wire (950) turns may form a coil that when energized may produce an electromagnetic field that may be directed by the ferrite channel (945) toward an opposed inductive coupler of a mating drill pipe joint. See prior art FIGS. 16-19, herein. A gapless ferrite channel (945) may enhance the electromatic field. An opposed inductive coupler may not be configured similarly with the inductive coupler block (910) of this disclosure and yet couple the magnetic field. In other words, different designs, versions, and styles of inductive couplers may be electromagnetically coupled with the block (910) of this disclosure. For example, see U.S. Pat. No. 8,735,743 to Harmon et al., entitled Transducer device having strain relief coil housing, issued May 27, 2004, incorporated herein for all it teaches and claims may couple with the block (910) of this disclosure.

The annular block (910) may comprise one or more bumpers (935) formed therein disposed around the outside periphery of the annular block (910) in the annular block's (910) side walls (970 and 970*a*) respectively. The bumper (935) may be continuous around the annular block's periphery, or it may comprise one or more discrete bumpers (935) spaced intermittently around the periphery of block (910). The bumper (935) may comprise a side wall that may extend diagonally from the outermost edge of the bumper (935) downward to the side walls (970 and 970*a*) of the block (910). The bumper (935) may comprise an opening (975) for added compliancy when the block (910) is installed or removed. In the shoulder (905), the external side wall (990*a*) is the sidewall of the groove (990) radially farthest from the pipe's internal bore (see prior art FIG. 14). The external side wall (990*a*) of the circular groove (990) may comprise a recess (930) that may be open to the bumper (935) in the block's (910) sidewall (970) when the block (910) is installed or removed. It may be preferred to locate the recess (930) in sidewall (990*a*) because it may be more resistant to compression damage if the pipe joint is damaged or over torqued. The recess (930) may comprise a lead-in (925) or a ledge (925) such that when the block (910) is installed into the groove (990) the bumper intersects with the recess (930) thereby at least partially removably securing the block (910) in the groove (990).

The block (910) may comprise one or more internal void openings (940, 940*a*) adjacent its side surfaces. Void openings (940, 940*a*) may be circular or elongate. Void opening (940) may be disposed proximate the bumper (935). The void openings (940, 940*a*) may promote compliancy in the block. The void opening (940) allows the bumper (935) to flex as the block is press fit into the groove (990) and is removed from the groove (990). Once the bumper (935) enters the recess (930) in the groove's side wall (990*a*), the bumper is allowed to spring back so that the block (910) is at least partially secured in the groove. The internal void openings 940, 940*a*) may form a continuous ring around the interior of the block. Or the void openings may be discrete openings intermittently arranged such that a plurality of void openings (940, 940*a*) may be positioned around the interior circumference of the block. A void opening (940*a*) may be located adjacent the curved bottom surface (980) of the block (910) and may permit the block (910) to move vertically or compress in the event debris remains on the top surface of the block (910) when the joint is made up. Also, compliancy in the block provided by the void openings may protect the block (910) in the event the shoulder (905, 920) is damaged in the makeup process or compressed or deformed by an over-torqued drill pipe joint.

The block (910) further may comprise an internal annular gasket (960) that may comprise a collar portion (995) partially extending from the bottom surface (980) of the block. The internal gasket (960) may be molded into the block (910) when it is first formed with the other coupler elements. The external portion of the gasket (960) may be formed to fit within a mating gasket seat (955) in the bottom (985) of the groove. The wire (950) may pass through an opening in the center of the gasket (960) as an exit path for the wire (950) from the block (910). When the block (910) is installed into the groove (990), the gasket (960) may be pressed into the gasket seat (995), the gasket (960) may seal the wire (950) and the annular block (910) from the downhole environment. The external portion of the gasket (960) may comprise ribs (not shown) to aid in the sealing of the block. The collar (995) may provide stability for the gasket (960) within the block (910) and aid in its sealing function. The gasket (960) may serve as an aid for the seal set (see Prior Art FIG. 9 at ref. 140 herein) disposed further down the conductive wire (950). The gasket (960) may provide sufficient sealing so as to reduce or eliminate dependence on the seal set shown in prior art FIG. 9. The gasket (960) may serve to removably fix the block (910) in the groove (990).

The block (910) may further comprise an electromagnetic shield (965) enclosing the sides and bottom of the ferrite (945). The shield may be composed of a magnetically conductive electrical insulating material. The shield may aid in focusing the magnetic field and preventing stray electromagnetic interference with the block (910).

Prior art FIG. 2 illustrates a drilling operation 10 in which a borehole 36 is being drilled through subsurface formation beneath the surface 26. The drilling operation includes a drilling rig 20 and a drill string 13 having central axis 11 (shown in prior art FIG. 3) of coupled tubulars or drill pipe 12 which extends from the rig 20 into the borehole 36. A bottom hole assembly (BHA) 15 is provided at the lower end of the drill string 13. The BHA 15 may include a drill bit or other cutting device 16, a bit sensor package 38, and a directional drilling motor or rotary steerable device 14, as shown in prior art FIG. 2.

The drill string 13 preferably includes a plurality of network nodes 30. The nodes 30 are provided at desired intervals along the drill string. Network nodes essentially function as signal repeaters to regenerate data signals and mitigate signal attenuation as data is transmitted up and down the drill string. The nodes 30 may be integrated into an existing section of drill pipe or a downhole tool along the drill string. Sensor package 38 in the BHA 15 may also include a network node (not shown separately). For purposes of this disclosure, the term "sensors" is understood to comprise sources (to emit/transmit energy/signals), receivers (to receive/detect energy/signals), and transducers (to operate as either source/receiver). Connectors 34 represent drill pipe joint connectors, while the connectors 32 connect a node 30 to an upper and lower drill pipe joint. As is standard in the art, each section of drill pipe 12 has a box joint at one end and a pin joint at the opposite end. Further, each pipe joint has a coupler having a core of magnetic material that transfers signals from one drill pipe 12 to the next. When the pipe joint is made up, the cores transfer the magnetic field from one side to the other. When a coil on one side receives an applied signal, it generates a magnetic field. The core transfers the magnetic field to the other coil which generates an induced signal. One of the factors affecting the efficiency of transfer of the signal is the existence of any stray fields that exist outside of the core magnetic material on each side of the pipe joint and extend out into the pipe. The existence of a gap also introduces stray magnetic fields. These stray magnetic fields contribute to the losses produced in the inductive coupler. These stray magnetic fields can be reduced with careful shaping of the core of the inductive coupler.

This disclosure describes an assembly and a method for controlling the stray magnetic fields of an inductive coupler to reduce the associated losses. This results in reduced attenuation (increased efficiency) of the inductive coupler even in the presence of gaps. The stray magnetic fields that extend outside the inductive coupler and into the surrounding drill pipe result in losses due to induced currents and subsequent resistive heating. The extent at which the fields extend outside the core depends on the material properties of the outside material and the frequency.

The depth of penetration is called the skin depth and has the form delta..omega..mu..times..times..sigma. ##EQU00001## where .delta. is the skin depth, .omega. is the circular frequency and .sigma. is the conductivity. The amplitude of the electric field is proportional to the magnetic field H by the form .omega..times..pi..times..mu..sigma-..times. ##EQU00002##. The electric field can be reduced by having a permeability of 1 and a conductivity as high as possible. Reducing the skin depth can also reduce the amount of resistive heating; for example, with a large permeability and a high conductivity. The electric field in penetrating into the pipe would start with the amplitude of the electric field (E) and decay following the skin depth (.delta.). The desire is to reduce the power dissipated in the surrounding material. The power density dissipated by this electric field is P=.sigma.E.sup.2 Substituting in equations for the skin depth (.delta.), the amplitude of the electric field (E), and the power density (P), and multiplying by the volume where the E field decays (A.delta.) gives the power dissipated in terms of permeability and conductivity. Combining constants and parameters so that permeability and conductivity are clear gives .times..omega..mu..sigma..times..times..times..omega..mu..sigma. ##EQU00003## The exponential term contains the skin depth. Increasing the permeability reduces the depth penetration and increases the amplitude of the electric field. For materials representing pipe steel, copper, and a magnetic core material (high permeability and conductivity) at 2 MHz, the power dissipated in the pipe is greater than for the copper. Further, the magnetic core material has a high permeability for a small skin depth and a conductivity intermediate to that of the copper and pipe steel. While the high permeability yields a small skin depth, the conductivity is not high enough to compensate for the increased amplitude and so more power is dissipated than the copper.

Referring still to prior art FIG. 2, the nodes 30 comprise a portion of a downhole electromagnetic network 46 that provides an electromagnetic signal path that is used to transmit information along the drill string 13. The downhole network 46 may thus include multiple nodes 30 based along the drill string 13. Communication links 48 may be used to connect the nodes 30 to one another and may comprise cables or other transmission media integrated directly into sections of the drill string 13. The cable may be routed through the central borehole of the drill string 13, or routed externally to the drill string 13, or mounted within a groove, slot or passageway in the drill string 13. Preferably signals from the plurality of sensors in the sensor package 38 and elsewhere along the drill string 13 are transmitted to the surface 26 through a wire conductor 48 along the drill string 13. Communication links between the nodes 30 may also use wireless connections.

A plurality of packets may be used to transmit information along the nodes 30. Packets may be used to carry data from tools or sensors located downhole to an uphole node 30, or may carry information or data necessary to operate the network 46. Other packets may be used to send control signals from the top node 30 to tools or sensors located at various downhole positions.

Referring to prior art FIGS. 2 through 4, a drilling system 10 (prior art FIG. 2) further comprises an embodiment of a removable induction coupler assembly or system 100 (prior art FIG. 3) having a central axis 101 coaxial with drillstring central axis 11. The removable induction coupler system 100 comprises a housing 110 (prior art FIG. 4), an overmold 120 (prior art FIG. 3) having a plurality of retention lugs 125 and openings 127, and a wire 130 having a plurality of coverings and seals 140. Housing 110 is generally cylindrical and has a substantially U-shaped cross section with an exterior underside 110*a*, an inner side wall 110*b*, an outer side wall 110*c*, and an interior channel 110*d*. Housing 110 may be made of any suitable material known in the art, including but not limited to metals.

Referring to prior art FIG. 4, housing 110 further comprises anti-rotation bosses 112, an anti-rotation pin 113, rectangular protrusions 114, spacers 116, and ferrites 118. Each anti-rotation boss 112 is generally cylindrical, extending axially downward from the exterior underside 110*a* of the housing 110. Further, the anti-rotation bosses 112 each have a throughbore 112*a* to allow wire 130 to pass therethrough (however, in most embodiments, wire 130 will pass through only one anti-rotation boss 112). Each anti-rotation boss 112 interfaces with a corresponding bore in the drill pipe 12 to prevent rotation of the coupler system 100. Further, for ease of installation, bosses 112 are spaced equidistantly apart on housing 110, but need not be. In the present embodiment, three anti-rotation bosses are preferably disposed on housing 110 (two shown in prior art FIG. 4); however, in alternative embodiments, housing 110 may comprise one or more anti-rotation bosses 112.

Anti-rotation pin 113 is generally T-shaped, and comprises a rectangular horizontal portion 113H disposed at the bottom of housing interior channel 110*d* and a cylindrical vertical portion 113V disposed orthogonal to horizontal portion 113H. The anti-rotation pin 113 further comprises a throughbore 113*a* that extends axially downward through both the horizontal and vertical portions 113H, 113V, respectively. Further, throughbore 113*a* is coaxial with throughbore 112*a* of anti-rotation boss 112 and anti-rotation pin 113 is sized to fit within boss 112, such that pin 113 insulates wire 130 from the housing 110 (shown in prior art FIG. 8) as the wire 130 passes through boss 112.

Referring now to prior art FIG. 4, rectangular protrusions 114 are generally rectangular and each protrusion 114 extends radially inward from housing inner side wall 110*b* toward central axis 101 and extends radially outward from housing outer side wall 110*c*. Protrusions 114 are shown in the present embodiment equidistantly and circumferentially spaced about housing 110; however, in other embodiments, protrusions may be unevenly spaced about housing 110. Each protrusion 114 houses a spacer 116, which extends radially from inner side wall 110*b* to outer side wall 110*c* and comprises a channel 116*a* through which wire 130 is disposed.

Ferrites 118 are disposed end-to-end in housing interior channel 110*d* between spacers 116, such that ferrites 118 are disposed in substantially the entire interior channel 110*d*. Ferrites 118 may be made of any suitable material containing a magnetic field known in the art, including but not limited to 61 NIZN made by Fair-Rite Corp., Co-Nectic AA made by Magnetic Shield Corp., and Fluxtrol made by Fluxtrol Corp. Similar to the spacers 116, each ferrite 118 comprises a channel 118*a* through which wire 130 is disposed. Thus, wire 130 passes through and rests in the channel 116*a* of each spacer 116, passes through and rests in the channel 118*a* of each ferrite 118, and then passes through the throughbore 113*a* in anti-rotation pin 113 along with throughbore 112*a* of anti-rotation boss 112, and on to a coaxial data cable embedded in the tool joint of drill string 12.

Referring now to prior art FIG. 3, overmold 120 completely encases the housing 110 and comprises a top surface 120*a* opposite a bottom surface 120*b*, an inner side wall 120*c* coaxial with an outer side wall 120*d*, retention lugs 125, and openings 127. Overmold top surface 120*a* encases the spacers 116, ferrites 118, and wire 130 (shown in FIG. 3). Overmold bottom surface 120*b* encases the housing exterior underside 110*a* and comprises an opening for each anti-rotation boss 112, allowing each boss 112 to extend beyond the overmold bottom surface 120*b*. Overmold 120 may be made of any suitable material known in the art that may be used in a downhole environment, including but not limited to polymers, and preferably polyether ether ketone (PEEK).

Referring now to prior art FIGS. 3 and 5, inner side wall 120*c* further comprises circumferentially and equidistantly spaced retention lugs 125. Each retention lug 125 comprises a thin strip having end points 125*a*, 125*b* attached to inner side wall 120*c* and a middle portion 125*c* that protrudes axially inward toward central axis 101. During installation into a drillstring pin end or box end, retention lug middle portion 125*c* is deformed radially outward toward inner side wall 120*c* as the retention lug 125 slides by drillstring lip 50, and retention lug 125 pops back out into groove 55 upon clearing lip 50. Thus, removable induction coupler system 100 is retained in the drillstring pin or box end when retention lugs 125 clear lip 50 and expand into groove 55. Retention lugs 125 further act as a centering function during installation into a drillstring component (pin end or box end) and eliminate overtorque damage because lugs 125 absorb any permanent pin nose (radial) deformation. In the present embodiment, retention lugs 125 are spaced equidistantly apart on housing 110 but need not be. Further, in the present embodiment and preferably, three retention lugs 125 are used; however, in alternative embodiments, more retention lugs may be used Referring now to prior art FIGS. 3 and 4, outer side wall 120*d* further comprises circumferentially and equidistantly spaced openings 127, which align with circumferentially and equidistantly spaced protrusions 114. Protrusions 114 may be used to further center the induction coupler system 100 in the drill string 13 component and as a secondary or tertiary grounding path for system 100. Similar to the protrusions 114 shown in the present embodiment to be equidistantly and circumferentially spaced about housing 110, in other embodiments, openings 127 may also be unevenly spaced about overmold outer side wall 120*d* to correspond to the unevenly spaced locations of the protrusions 114 on housing 110. In yet other embodiments, outer side wall 120*d* may not have any openings.

Referring now to prior art FIGS. 4 and 6, and as previously described, wire 130 passes through and rests in the channel 116*a* of each spacer 116, passes through and rests in the channel 118*a* of each ferrite 118, and then passes through the throughbore 113*a* in anti-rotation pin 113 along with through throughbore 112*a* of anti-rotation boss 112, and on to a coaxial data cable. Wire 130 has a plurality of coverings and seals 140.

Referring now to prior art FIG. 6, insulation 170 provides a first covering for wire 130. Insulation 170 is substantially cylindrical and disposed on top of and encases wire 130. Insulation 170 extends axially downward from housing exterior underside 110*a* any suitable distance known in the art. Insulation 170 may be made of any suitable material known in the art, including but not limited to polymers (e.g., PEEK, Teflon).

Referring still to prior art FIG. 6, seal stack spacer 160 is substantially cylindrical and provides a second covering for wire 130 and extends from housing exterior underside 110*a* axially downward. Seal stack spacer 160 may extend axially downward any suitable distance known in the art, including far enough downward to locate the seal stack 140 (discussed further below) properly in the inner diameter of the armored coax tubing or data cable tubing 180 (see prior art FIG. 9). Seal stack spacer 160 provides seal stack compression by compressing against the armored coax tubing 180 in pipe 12 (see FIG. 8). Seal stack spacer 160 may be made of any suitable material known in the art, including but not limited to polymers (e.g., Teflon, PEEK).

Referring now to prior art FIGS. 4, 7, and 9, grounding tube 150 provides a third covering for wire 130. Grounding tube 150 is substantially cylindrical and disposed on top of and encases seal stack spacer 160. Grounding tube 150 extends axially downward from housing exterior underside 110*a* the same distance as the seal stack spacer 160, such that the lower ends 160*a*, 150*a* of seal stack spacer 160 and grounding tube 150, respectively, are flush with each other. Grounding tube 150 may be made of any suitable material that will conduct well enough to provide ground from the coupler 100 to the armored coax data cable embedded in tool joint of drill string 12.

Referring now to prior art FIGS. 3 and 9, seal stack 140 provides a fourth covering for wire 130. Seal stack 140 is substantially cylindrical and disposed directly on wire 130 and extends axially downward from the lower ends 160*a*, 150*a* of seal stack spacer 160 and grounding tube 150, respectively. Seal stack 140 may extend axially downward any suitable distance known in the art. Seal stack 140 comprises a series of O-rings 141 separated by spacers 142. Seal stack 140 further comprises an angled back up 143, which is a spacer having an angled end 143*a*, disposed at the lower end of seal stack 140. Seal stack 140 may be made of any suitable material known in the art, including but not limited to polymers.

Seal stack 140 sealingly engages armored coax tubing or data cable tubing 180, which extends above seal stack 140 to also interface with grounding tube 150. Data cable tubing 180 may be made of any suitable material known in the art, including but not limited to metals. The interface between the grounding tube 150 and the data cable tubing 180 provides a robust ground path. In addition, tapered portion 175, disposed below seal stack 140, comprises a tapered end that wedges into the data cable tubing 180 to provide a backup for the seal stack 140. Tapered portion 175 may be made of any suitable material known in the art, including but not limited to ceramics and polymers. For example, tapered portion 175 may be made of ceramic flarel. Further, seal stack 140 and angled back up 154 may be removed and replaced when housing 110 is removed.

Referring to prior art FIGS. 10 and 11, another embodiment of an induction coupler assembly or system 200 is shown having a central axis 201 coaxial with drillstring central axis 11. The removable induction coupler system 200 comprises a retention bushing 210, a retention pin 230 having a plurality of grooves or channels 233, 235, 237, a housing 250, a retention biasing element or spring element 260, an electrical contact 270, a coupler 280, and a wire 290. Retention bushing 210 is tubular and has an outer cylindrical surface 210*a* coaxial with an inner cylindrical surface 210*b*, an upper end 210*c* opposite a lower end 210*d*, and an upper sloped surface 210*e* extending from the upper end 210*c* radially inward and axially downward toward lower end 210*d*, which results in the upper end 210*c* having an inner diameter that is greater than the inner diameter of lower end 210*d*. Bushing 210 is inserted into and press fit in a bore 205 in the drill pipe 12, where the bore 205 has a slightly larger opening than at a shoulder 205*a* in the bore. The retention bushing 210 receives the retention pin 230, which is attachably connected to the coupler 280 (to be described in more detail below); thus, the retention bushing 210 must be inserted into bore 205 to a precise depth to place the coupler 280 at the proper location. In an alternative embodiment, the features and contours of the retention bushing 210 are machined directly into the pipe 12.

In the present embodiment, the shoulder 205*a* is machined and located at the precise location needed to properly position the coupler 280 and bushing 210 is inserted all the way to the shoulder 205*a*, such that bushing lower end 210*d* is in contact with shoulder 205*a* of the bore. In another embodiment, shown in prior art FIG. 12, the bushing 210 is inserted into bore 205 to a precise depth above shoulder 205*a* through use of a tool.

Referring now to prior art FIG. 11, retention pin 230 is tubular, coaxial with retention bushing 210, and comprises three external channels or grooves 233, 235, 237. Retention pin 230 has an upper end 230*a* opposite a lower end 230*b* and an outer cylindrical surface 230*c* coaxial with an inner cylindrical surface 230*d*. Removable induction coupler system 200 preferably has three retention pins 230 circumferentially and equidistantly spaced around housing 250; however, in an alternative embodiment, system 200 may have 2-6 retention pins 230. The three external channels 233, 235, 237 are disposed on outer cylindrical surface 230*c*. The first or lower channel 233 receives the retention spring element 260 and the second or middle channel 235 receives the electrical contact 270, to be discussed in further detail below. The third or upper channel 237 does not receive any components in the present embodiment. Retention pins 230 may be made of any suitable material known in the art, including but not limited to metals.

Housing 250 for coupler 280 is cylindrical, has an upward-facing channel or U-shaped cross section 250*a* with two extensions or legs 250*b* extending axially downward from the bottom of the channel 250*a*. Housing 250 may be made of any suitable material known in the art, including but not limited to metals. The extensions 250*b* are welded onto the retention pin inner cylindrical surface 230*d* near upper end 230*a* of retention pin 230. Thus, the removal of coupler 280 would also remove the three retention pins 230 welded to the housing 250. In alternative embodiments, the retention pins 230 may be stamped or machined as part of the housing 250.

Referring still to prior art FIG. 11 and as previously discussed, retention biasing element or spring element 260 snaps over and into the first or lower channel 233. Retention spring element 260 may be made of any suitable material known in the art, including but not limited to a spring, elastomer, and a spring loaded portion. Retention spring element 260, for example, could be a square cross-section O-ring.

As previously discussed, electrical contact 270 snaps over and into the second or middle channel 235. Electrical contact 270 may be made of any suitable material known in the art. Electrical contact 270 utilizes the retention pin 230 as part of the grounding path, removing the need to have a grounding tube as in the first embodiment of a removable induction coupler system 100. The ground path would thus go from the coupler 280 to the retention pin 230, out into the pipe 12, and then through the pipe to the data cable (not shown).

After the electrical contact 270 is installed on retention pin 230, the retention pin 230 may be installed in the retention bushing 210 by pushing the retention pin 230 into the center of the retention bushing 210 until both the retention spring element 260 and the electrical contact 270 interface with the retention bushing 210.

Referring still to prior art FIG. 11, wire 290 passes through coupler 280 and exits the housing 250 through a bore between extension legs 250*b* and disposed on the bottom of housing channel 250*a*. Wire 290 then passes through insulation 295 disposed along the axial length of inner cylindrical surface 230*d* of the retention pin 230, such that wire 290 does not directly contact the retention pin 230. Though not shown, the present embodiment uses a seal stack spacer and seal stack similar to the seal stack spacer 116 and seal stack 140 as used in the first embodiment of a removable induction coupler system 100.

By moving the retention pin 230 away from the surface of the secondary shoulder 59 (an area subject to deformation) to below the surface of the pin end, the retention features are in a more stable area of the pipe 12 and subject to less deformation. Further, when the coupler 280 is removed, the retention pin 230, retention spring element 260, electrical contact 270, and the seal stack (not shown) are also removed and may be replaced while reusing the coupler 280.

Referring to prior art FIGS. 13, 14, and 15, a further embodiment of a removable induction coupler assembly or system comprising a removable box end induction coupler system 300 (prior art FIG. 14) and a removable pin end induction coupler system 400 (prior art FIGS. 13 and 15) is shown having a central axis 301, 401, respectively, each coaxial with drillstring central axis 11. The removable box end induction coupler system 300 shown in prior art FIG. 14 comprises a retention ring 310, a retention biasing element or spring 360, and a coupler 380. Retention ring 310 is cylindrical and has an upper end 310*a* opposite a lower end 310*b*; an inner cylindrical surface 310*c* coaxial with outer cylindrical surfaces 310*d* (upper), 310*e* (middle), 310*f* (lower); an upper lip 311 disposed between the upper and middle outer cylindrical surfaces 310*d*, 310*e*, respectively; and a lower lip 312 disposed between the middle and lower outer cylindrical surfaces 310*e*, 310*f*, respectively. Retention ring 310 is inserted into and press fit in an inner diameter of a box end of the drill pipe 12, where the bore 305 has a slightly larger opening than at a shoulder 305*a* in the bore. In alternative embodiments, retention ring 310 may be threaded or have a snap or other retention feature with a corresponding groove in the pipe. Retention ring 310 may be made of any suitable material known in the art, including but not limited to metals.

The removable pin end induction coupler system 400 shown in prior art FIG. 13 comprises a retention ring 410 and a coupler 480, which is nominally configured in a manner that is essentially identical to the box end coupler 380, but which may also have location specific variations. The pin end in the configuration as shown has no spring like the spring 360 (shown in prior art FIG. 14), but a spring could also be optionally added to a pin configuration as needed to meet operational requirements. Retention ring 410 is inserted into and press fit in an inner diameter of a pin end of the drill pipe 12, where the bore 405 has a slightly larger opening than at a shoulder 405*a* in the bore. When there is no spring, as shown, the configuration of the retention ring 410 would be similar to that of retention ring 310, but without an intermediary lip 312, and the size of the ring would be appropriately correlated to the diameter of pipe bore 405. As with the box end configuration, in alternative embodiments, retention ring 410 may be threaded or have a snap or other retention feature with a corresponding groove in the pipe. Retention ring 410 may be made of any suitable material known in the art, including but not limited to metals.

Spring 360 is a continuous ring that goes around the entire pipe 12 circumference below housing 350 and in a shoulder of pipe 12. Spring 360 allows inductive couplers to be brought into contact with adequate force independent of manufacturing and assembly tolerances or subsequent operational deformations. Spring 360 may be made of any suitable material with elastic properties known in the art including, but not limited to, a metallic spring, elastomer, and a spring-loaded portion.

Referring now to prior art FIG. 14, coupler 380 includes a housing 350 having a ledge 355 and a wire 390. Housing 350 is cylindrical, has an upward-facing channel or U-shaped cross section 350*a* with a bottom face 350*b* and a side wall 350*c*. Housing 350 further comprises a ledge or flat ring 355 that is coupled to the bottom face 350*b* of the housing 350 and extends radially inward past side wall 350*c*, creating a ledge or shoulder. Housing 350 may be made of any suitable material known in the art, including but not limited to metals. In the present embodiment, ledge or flat ring 355 is welded to the bottom face 350*b* of housing. In alternative embodiments, ledge 355 may be machined or manufactured directly on the housing 350.

During installation, spring 360 is placed in box end shoulder 58 before the housing 350 is inserted, followed by the retention ring 310, which locks the spring 360 and housing 350 in place. In an alternative embodiment, the spring 360 may be located under housing 350, such that the spring 360 and housing 350 are installed together as an assembly.

Referring still to prior art FIG. 14, wire 390 may be single would or double wound throughout coupler 380 in housing 350 for the transmittal of signals. Wire 390 may be made of any suitable material having suitable electrical conductivity. Wire 390 is further surrounded by a segmented or solid continuous ring of flux channel material 395 disposed in housing 350; flux channel material 395 may be bonded or adhered to housing 350 or snapped in place with retention pieces. Flux channel material 395 may be made of any suitable electrically non-conductive material having favorable magnetic field permeability properties known in the art including, but not limited to, ferrite and Fluxtrol. Further, wire 390 is buried with a filler (not shown) that covers the entire opening of the housing 350. Filler may be any suitable material known in the art, including but not limited to epoxy and PEEK. The grounding path goes from the termination of the coil wire (not shown) to the shielding of the data cable (not shown). Further, when the coupler 380 is removed, the retention ring 310 is also removed.

Referring to prior art FIG. 15, the removable pin end induction coupler system 400 comprises a retention ring 410, a housing 450 having a ledge 455, an anti-rotation pin 470, a coupler 480, and a wire 490. Retention ring 410 is cylindrical and has an upper end 410*a* opposite a lower end 410*b*; an inner cylindrical surface 410*c* coaxial with outer cylindrical surfaces 410*d* (upper), 410*e* (lower); and a lip 411 disposed between the upper and lower outer cylindrical surfaces 410*d*, 410*e*, respectively. Retention ring 410 is inserted into and press fit in an inner diameter of a pin end of the drill pipe 12, where the bore 405 has a slightly larger opening than at a shoulder 405*a* in the bore. In alternative embodiments, retention ring 410 may be threaded or have a snap or other retention feature with a corresponding groove in the pipe. Retention ring 410 may be made of any suitable material known in the art, including but not limited to metals.

Housing 450 for coupler 480 is cylindrical, has an upward-facing channel or U-shaped cross section 450*a* with a bottom face 450*b* and a side wall 450*c*. Housing 450 further comprises a ledge or flat ring 455 that is coupled to the bottom face 450*b* of the housing 450 and extends radially inward past side wall 450*c*, creating a ledge or shoulder. Housing 450 may be made of any suitable material known in the art, including but not limited to metals. In the present embodiment, ledge or flat ring 455 is welded to the bottom face 450*b* of housing. In alternative embodiments, ledge 455 may be machined or manufactured directly on the housing

450. In an embodiment, the couplers 380, 480 for the box end and pin end, respectively, are the same. During installation, coupler 480 is placed in pin end shoulder 54 before the retention ring 410 is press fit to lock the coupler 480 in place.

Referring now to prior art FIGS. 14 and 15, box end housing 350 extends above shoulder 56 in the box end of pipe 12 an amount equivalent to the amount pin end housing 450 is recessed in the pin end of pipe 12 plus sufficient over-travel to allow for tolerances and operational deformations. The spring 360 under the coupler 380 in the box end of the pipe 12 is partially compressed during coupler installation to ensure sufficient coupler-to-coupler contact force during operation. By placing the pin end housing 450 in a recessed state relative to the secondary shoulder face 54 in the pin end of pipe 12, coupler system 400 is less susceptible to damage during handling.

Referring still to prior art FIG. 15, anti-rotation pin 470 is disposed offset from the housing 450 and extends axially downward from housing 450. Anti-rotation pin 470 is tubular, has an external cylindrical surface 470*a* coaxial with an internal cylindrical surface 470*b*, and an internal lip 470*c* with a throughbore 470*d*. Anti-rotation pin 470 comprises a plug 472, a connector 474, heat shrink 476, and an insulator 478. Plug 472 fills in any gap left between the wire 490, housing 450, and the internal cylindrical surface 470*b* of anti-rotation pin 470. Plug 472 may be made with any suitable material known in the art. In the present embodiment, the wire 490 transitions from a larger diameter to a smaller diameter within the coupler 480. In an alternative embodiment, one continuous wire 490 may be used. Connector 474 holds the thicker wire 495 in contact with the magnet wire 490 and heat shrink 476 further encases connector 474 and a portion of wires 490, 495. Insulator 478 is tubular, disposed on internal lip 470*c*, and prevents a short from occurring between the connector 474 and the anti-rotation pin 470. Insulator 478 may be made of any suitable material known in the art, including but not limited to a polymer and a ceramic. For example, insulator 478 may be made with PEEK.

Referring still to prior art FIG. 15, wire 490 may be double wound through coupler 480 in housing 450 and surrounded by a solid continuous ring of Flux channel material disposed in housing 450. Wire 490 then exits the housing 450 through a bore 451 disposed on the bottom of housing 450*b*. Wire 490 then passes through heat shrink 476, connector 474, and insulator 478 before connecting to thicker wire 495. Wire 490 may be made of any suitable material having suitable electrical conductivity. Wire 490 is further surrounded by a segmented or solid continuous ring of flux channel material 480 disposed in housing 450. Flux channel material 480 may be bonded or adhered to housing 450 or snapped in place with retention pieces using any suitable method known in the art. The flux channel material may be made of any suitable electrically non-conductive material having favorable magnetic field permeability properties know in the art including, but not limited to, ferrite or Fluxtrol. The primary grounding path is directly attached to the anti-rotation pin and goes from the termination of the coil wire (not shown) to the shielding of the data cable (not shown). Further, when the retention ring 410 is removed, the coupler 480 is also removed.

Referring to prior art FIG. 16, an additional embodiment of an induction coupler assembly or system 600 is shown. The induction coupler system 600 is disposed in an annular groove or channel 610 in the face of a joint 620 between two sections of drill pipe 12, the drill pipe having an inner radius 12*a* and an outer radius 12*b*. The induction coupler system 600 shown in FIG. 15 is shown at a generic location in a pipe joint; in other embodiments, the location of the induction coupler system 600 may vary. In the present embodiment, one end of the joint 620 is a box end 18 and the other end of joint 620 is a pin end 19 of drill pipe 12. Annular groove 610 has a bottom 610*a* opposite an opening 610*b*, an inner side wall 610*c*, and an outer side wall 610*d*. System 600 comprises a shell 650, a ferrite ring 618, and a wire 690.

Shell 650 is generally cylindrical and has a substantially U-shaped cross section with an external bottom end 650*a* opposite a top end 650*b*; cylindrical external side walls 650*c*, 650*d*; an internal bottom surface 650*e*; and cylindrical internal side walls 650*f*, 650*g*. Shell 650 is disposed in annular groove 610 such that shell external bottom 650*a* is in contact with groove bottom 610*a*, shell cylindrical external side walls 650*c*, 650*d*, are in contact with groove inner and outer side walls 610*c*, 610*d*, respectively, and shell top end 650*b* is aligned with groove opening 610*b*. Shell 650 may be made of any suitable material having an appropriate permeability and conductivity to reduce the power dissipated compared to the surrounding material (discussed in more detail below). For example, shell 650 may be made of copper or beryllium copper.

Referring still to prior art FIG. 16, ferrite ring 618 is generally cylindrical and has a substantially U-shaped cross section with an external bottom end 618*a* opposite a top end 618*b*, an exterior inner side wall 618*c*, an exterior outer side wall 618*d*, and an annular channel 630. Ferrite ring 618 is disposed in shell 650, such that ferrite ring external bottom end 618*a* is in contact with ferrite ring internal bottom surface 650*e*, ferrite ring exterior inner side wall 618*c* is in contact with shell interior inner cylindrical surface 650*f*, ferrite ring exterior outer side wall 618*d* is in contact with shell interior outer cylindrical surface 650*g*, and ferrite ring top end 618*b* is aligned with shell top surface 650*b*. Ferrite ring 618 may be made of any suitable material standard in the art containing a magnetic field known in the art, including but not limited to 61 NIZN made by Fair-Rite Corp., Co-Nectic AA made by Magnetic Shield Corp., and Fluxtrol made by Fluxtrol Corp. The wire 690 has four turns in both the box and pin ends 18, 19, respectively, and is disposed in the annular channel 630 of the ferrite ring 618. In other embodiments, the wire 690 may have one or more turns.

In the present embodiment, the groove openings 610*b*, the shell top surfaces 610*b*, the ferrite ring top ends 618*b*, and the ferrite ring annular channels 630 of the box end 18 and pin end 19 are aligned and separated by a gap 615. Gap 615 is preferably between 0.003-0.020 inches, and more preferably approximately 0.005 inches. Further, the induction coupler system 600 is symmetrical about joint 620, but need not be.

Referring now to prior art prior art FIG. 17, which shows an alternative version 800 of the embodiment of an induction coupler system 600. Induction coupler system 800 comprises a similar ferrite ring 818 having a channel 830, the ferrite ring 818 disposed in an annular groove 810 of drill pipe 12. Wire 890 of system 800 has two turns instead of four as shown in the embodiment of prior art FIG. 16. Similar to the embodiment shown in prior art FIG. 16, system 800 includes a gap 815 between the box end 18 and pin end 19 as well as between the ferrite ring 818, and annular groove 810. Instead of a shell 650, system 800 includes adhesive ring 850 that only covers part of the ferrite ring 818 near the gap 815 and not the whole ring 850. The ring 850 is made of any suitable material having an appropriate permeability and conductivity to reduce the power dissipated compared to the surrounding material. For example, ring 850 may be copper tape. In the present embodiment, ring 850 is adhered to the outer diameter of ferrite ring 818 (side of drill pipe 12 closest to the drill pipe outer radius 12*b*) and covers approximately 66.7% of the depth of the ferrite ring 818. Further, in the present embodiment, there is no adhesive disposed on the inner diameter of ferrite ring 818 (side of drill pipe 12 closest to the drill pipe inner radius 12*a*). Even with the partial coverage of the ferrite ring 818 with ring 850, the attenuation is still reduced.

The amount of power dissipated due to stray magnetic fields is reduced by the presence of a shell. Thus, by selecting an appropriate cladding material for the shell 650, the amount of power dissipated due to the stray magnetic fields can be reduced. As previously described, the material used for shell 650 may be any suitable material having an appropriate permeability and conductivity to reduce the power dissipated compared to the surrounding material. For example, shell 650 may be made of copper or beryllium copper.

Exemplary embodiments are described herein, though one having ordinary skill in the art will recognize that the scope of this disclosure is not limited to the embodiments described, but instead by the full scope of the following claims. The claims listed below are supported by the principles described herein, and by the various features illustrated which may be used in desired combinations.

What is claimed is:

1. An inductive coupler system comprising:

an annular block comprising an inductive coupler assembly molded therein comprising a ferrite ring forming a circular interior channel, and a conductive wire with one or more turns running along the interior channel;

the annular block comprising a planar top surface, a curved bottom surface, and the top surface and the bottom surface being joined by peripheral side surfaces defining an annular outer periphery of said block;

the annular outer periphery of said block comprising a bumper molded in the annular block, jutting out from the annular outer periphery; and the annular block further comprising a gasket within the annular block and extending from the curved bottom surface of the annular block, the gasket comprising an opening through which the conductive wire exits the annular block.

2. The system of claim 1, wherein the ferrite ring comprises a central channel comprising at least a partial opening to its top surface.

3. The system of claim 2, wherein the partial opening in the ferrite ring is less than the diameter of the conductive wire.

4. The system of claim 2, wherein the partial opening in the ferrite ring is greater than or equal to the diameter of the conductive wire.

5. The system of claim 1, wherein the block comprises an electrically insulating polymer selected from the group consisting of polyether ether ketone (PEEK), polytetrafluoroethylene (PTFE) (Teflon), or Polyoxymethylene (Delrin).

6. The system of claim 1, wherein the annular block comprises at least one void opening encapsulated in the block adjacent the annular outer periphery.

7. The system of claim 6, wherein the void opening is spherical.

8. The system of claim 1, wherein the annular block comprises two or more intermittent void openings encapsulated in the block spaced adjacent the annular outer periphery.

9. The system of claim 1, wherein the annular block comprises one or more elongate void openings encapsulated in the block.

10. The system of claim 1, wherein the bumper runs continuously along the annular outer periphery of the annular block.

11. The system of claim 1, wherein the annular outer periphery of the block further comprises additional spaced apart discrete bumpers.

12. The system of claim 11, wherein a void opening is encapsulated in the block adjacent each bumper.

13. The system of claim 1, wherein a void opening is disposed adjacent the curved bottom surface of the block.

14. The system of claim 1, wherein the gasket further comprises a collar portion within the annular block.

15. The system of claim 1, wherein the annular block is inserted into an annular groove having a curved bottom surface formed in the shoulder of a drill pipe, the curved bottom surface comprising a gasket seat and the gasket being seated therein.

16. The system of claim 15, wherein the gasket seals out downhole pressures and fluids from the annular block and the conductive wire.

17. The system of claim 15, wherein the block is disposed opposite another inductive coupler when a pipe joint is made up.

18. The system of claim 15, wherein the bumper mates with a recess in an opposed wall of the annular groove.

19. The system of claim 15, wherein the annular block is press fitted into the groove and the gasket seat.

20. The system of claim 1, wherein the annular block comprises an electromagnetic shield adjacent the ferrite ring.

* * * * *